United States Patent
Ishikawa et al.

(10) Patent No.: US 11,491,768 B2
(45) Date of Patent: Nov. 8, 2022

(54) INTERMEDIATE FILM FOR LAMINATED GLASS, AND LAMINATED GLASS

(71) Applicant: SEKISUI CHEMICAL CO., LTD., Osaka (JP)

(72) Inventors: Yuki Ishikawa, Osaka (JP); Shinji Kawada, Osaka (JP); Tatsuya Iwamoto, Shiga (JP); Nobuo Matsuki, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/964,945

(22) PCT Filed: Jan. 30, 2019

(86) PCT No.: PCT/JP2019/003180
§ 371 (c)(1),
(2) Date: Jul. 24, 2020

(87) PCT Pub. No.: WO2019/151327
PCT Pub. Date: Aug. 8, 2019

(65) Prior Publication Data
US 2021/0039360 A1 Feb. 11, 2021

(30) Foreign Application Priority Data

Feb. 2, 2018 (JP) .............................. JP2018-017723

(51) Int. Cl.
*B32B 17/10* (2006.01)
*B32B 27/08* (2006.01)
*B32B 27/30* (2006.01)

(52) U.S. Cl.
CPC ........ *B32B 17/10761* (2013.01); *B32B 17/10* (2013.01); *B32B 17/10036* (2013.01);
(Continued)

(58) Field of Classification Search
CPC .. B32B 17/00–17/1099; C08F 220/00–220/70
See application file for complete search history.

(56) References Cited

U.S. PATENT DOCUMENTS

| | | |
|---|---|---|
| 5,464,659 A | 11/1995 | Melancon et al. |
| 6,074,732 A | 6/2000 | Garnier et al. |
| (Continued) | | |

FOREIGN PATENT DOCUMENTS

| | | |
|---|---|---|
| CN | 106795049 A | 5/2017 |
| EP | 2 623 474 A1 | 8/2013 |
| (Continued) | | |

OTHER PUBLICATIONS

Carrot et al. (eds. Olabisi et al.). "Polyvinyl Butyral", Handbook of Thermoplastics, (2015); pp. 89-137.*

(Continued)

*Primary Examiner* — Prashant J Khatri
(74) *Attorney, Agent, or Firm* — Cheng Law Group, PLLC

(57) ABSTRACT

Provided is an interlayer film for laminated glass capable of enhancing the sound insulating property over a wide range of temperature from 0° C. to 40° C. An interlayer film for laminated glass according to the present invention is an interlayer film for laminated glass having a one-layer structure or a two or more-layer structure, the interlayer film includes a resin layer, and a ratio of a first storage modulus G' at a peak temperature of a maximum peak of tan δ to a second storage modulus G' at a temperature 100° C. higher than the peak temperature of the maximum peak of tan δ is 50 or more and 500 or less in viscoelasticity measurement at a frequency of 1 Hz in a shearing mode.

13 Claims, 2 Drawing Sheets

(52) U.S. Cl.
CPC ........ *B32B 17/10816* (2013.01); *B32B 27/08* (2013.01); *B32B 27/306* (2013.01); *B32B 2307/102* (2013.01)

(56) References Cited

U.S. PATENT DOCUMENTS

| | | |
|---|---|---|
| 2002/0068177 A1 | 6/2002 | Garnier et al. |
| 2005/0014007 A1 | 1/2005 | Garnier et al. |
| 2009/0159362 A1 | 6/2009 | Boure et al. |
| 2017/0028687 A1* | 2/2017 | DeRosa ................ C08F 220/28 |
| 2017/0334173 A1 | 11/2017 | Yui et al. |
| 2017/0361575 A1 | 12/2017 | Kusudou et al. |
| 2018/0001598 A1 | 1/2018 | Mikayama et al. |
| 2018/0001599 A1 | 1/2018 | Mikayama et al. |
| 2018/0001600 A1 | 1/2018 | Oohigashi et al. |
| 2018/0290436 A1 | 10/2018 | Yui et al. |
| 2018/0290437 A1 | 10/2018 | Kobayashi et al. |
| 2018/0290439 A1 | 10/2018 | Kusudou et al. |
| 2019/0091974 A1 | 3/2019 | Takahashi |
| 2019/0240958 A1 | 8/2019 | DeRosa et al. |
| 2019/0375196 A1 | 12/2019 | Yui et al. |
| 2020/0298535 A1 | 9/2020 | Asanuma et al. |

FOREIGN PATENT DOCUMENTS

| | | |
|---|---|---|
| EP | 3 438 065 A1 | 2/2019 |
| EP | 3 578 530 A1 | 12/2019 |
| JP | 10-177390 A | 6/1998 |
| JP | 2006-123497 A | 5/2006 |
| JP | 2006-248826 A | 9/2006 |
| WO | WO-2007/135317 A1 | 11/2007 |
| WO | WO-2013/051717 A1 | 4/2013 |
| WO | WO-2016/076339 A1 | 5/2016 |
| WO | WO-2016/158694 A1 | 10/2016 |
| WO | WO-2016/158695 A1 | 10/2016 |
| WO | WO-2016/158696 A1 | 10/2016 |
| WO | WO-2017/023644 A2 | 2/2017 |
| WO | WO-2017/170259 A1 | 10/2017 |
| WO | WO-2017/204342 A1 | 11/2017 |
| WO | WO-2017/209013 A1 | 12/2017 |

OTHER PUBLICATIONS

Written Opinion of the International Searching Authority (PCT/ISA/237) for Application No. PCT/JP2019/003180 dated Apr. 9, 2019 (English Translation mailed Aug. 13, 2020).
Supplementary European Search Report for the Application No. 19 747 539.5 dated Sep. 3, 2021.
International Search Report for the Application No. PCT/JP2019/003180 dated Apr. 9, 2019.
Written Opinion of the International Searching Authority (PCT/ISA/237) for Application No. PCT/JP2019/003180 dated Apr. 9, 2019.
The First Office Action for the Application No. 201980010663.2 from The State Intellectual Property Office of the People's Republic of China dated Mar. 9, 2022.
Notification of Reasons for Refusal for the Application No. 2019-515564 from Japan Patent Office dated Aug. 30, 2022.

* cited by examiner

[FIG. 1]
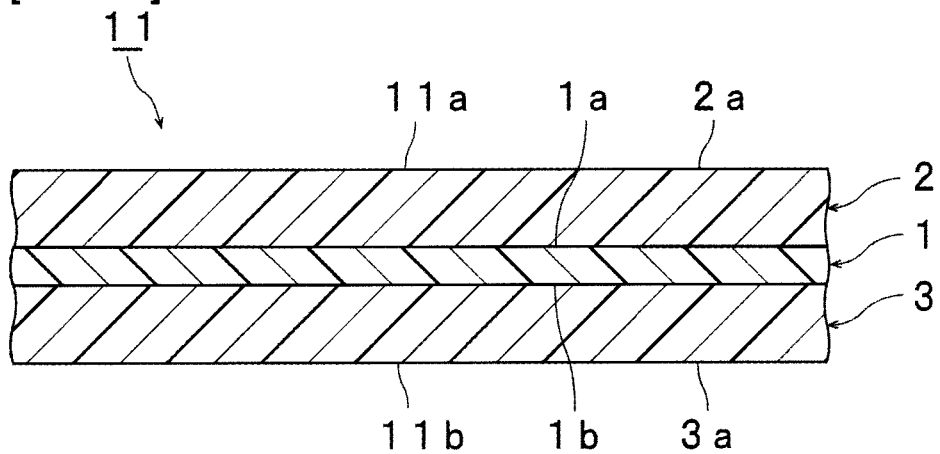
[FIG. 2]
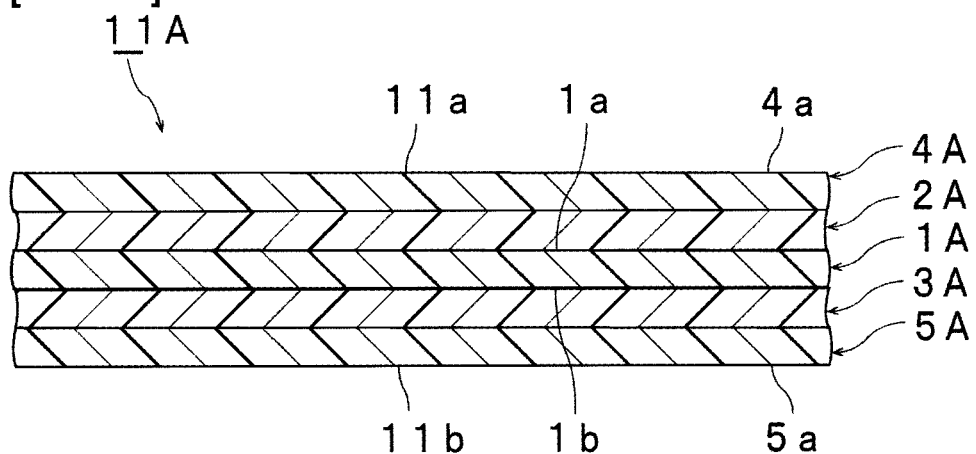
[FIG. 3]
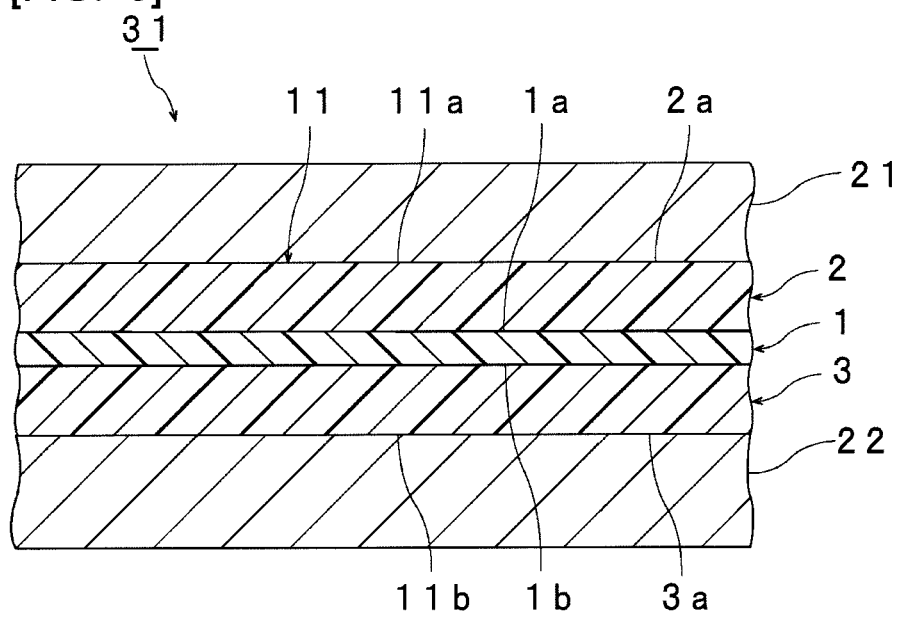

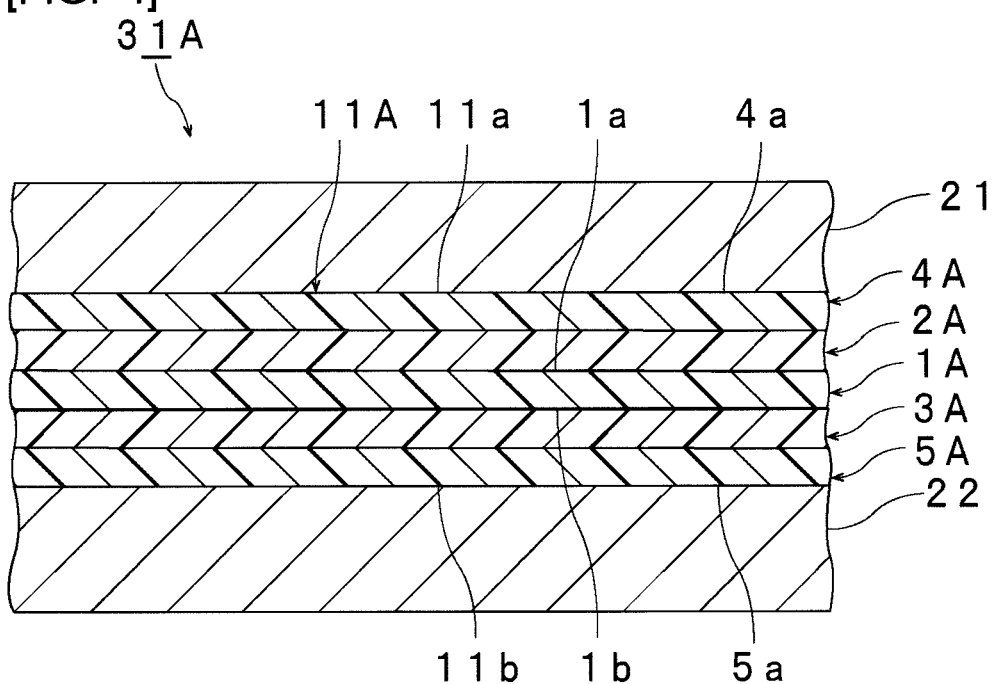

INTERMEDIATE FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass is produced by sandwiching an interlayer film for laminated glass between two glass plates.

As one example of the interlayer film for laminated glass, the following Patent Document 1 discloses an interlayer film having a sound insulating layer formed of composition (A) containing at least one resin (a1) selected from a thermoplastic resin and a thermosetting resin. Tan δ that is obtained when the dynamic viscoelasticity of the sheet formed of the aforementioned composition to have a thickness of 0.8 mm is measured at a frequency of 0.3 Hz in a tensile mode has the maximum value at temperature $T_A$ (° C.). In the measurement of the dynamic viscoelasticity, $T_A$ (° C.) ranges from −50 to 50° C., and tan δ at $T_A$ (° C.) is 2.5 or more.

Patent Document 1 indicates polyvinyl acetal, polyvinyl alcohol, polyurethane, polyvinyl carboxylate, olefin-vinyl carbonate copolymer, polyurethane elastomer, polyester elastomer, styrene-diene block copolymer, and chlorinated polyolefin, as the thermoplastic resin. Patent Document 1 indicates epoxy resins, phenol resins, urethane resins, melamine resins, and unsaturated polyester resins as the thermosetting resin.

Also, Patent Document 1 indicates that the sound insulating property of the interlayer film is enhanced. Examples of Patent Document 1 indicate, as measurement results of sound transmission loss at temperatures of 0° C., 5° C., 10° C., 15° C., 20° C., 25° C., 30° C., 35° C. and 40° C., the temperature at which the mean value of the sound transmission loss is the largest, and the sound transmission loss at the temperature at which the mean value of the sound transmission loss is the largest (mean value at a plurality of frequencies).

The following Patent Document 2 discloses a viscoelastic plastic insert (interlayer film). Patent Document 2 indicates shearing modulus G' of the aforementioned insert at 10° C. to 50° C. Patent Document 2 indicates dynamic loss factor tan δ of the aforementioned insert at 10° C. to 50° C.

RELATED ART DOCUMENTS

Patent Documents

Patent Document 1: WO2017/170259A1
Patent Document 2: WO2007/135317A1

SUMMARY OF THE INVENTION

Problems to be Solved by the Invention

A laminated glass including an interlayer film is used in various temperature environments. In a laminated glass prepared with a conventional interlayer film, it is sometimes the case that the sound insulating property cannot be enhanced over a wide range of temperature. A laminated glass having high sound insulating property at a specific one temperature can have low sound insulating property when the laminated glass is used at a temperature different from the specific one temperature.

Also, Patent Document 1 indicates that the sound insulating property of the interlayer film is enhanced. While Patent Document 1 evaluates the sound transmission loss at temperatures of 0° C., 5° C., 10° C., 15° C., 20° C., 25° C., 30° C., 35° C. and 40° C., it fails to indicate the results of sound transmission loss at every temperature of the plurality of temperatures. Patent Document 1 fails to indicate enhancement of the sound insulating property over a wide range of temperature by Examples.

Patent Document 2 indicates dynamic loss factor tan δ at temperatures of 10° C., 20° C., 30° C., 40° C., and 50° C. However, Patent Document 2 fails to indicate enhancement of the sound insulating property over a wide range of temperature from 0° C. to 10° C. by Examples.

The present invention is aimed at providing an interlayer film for laminated glass capable of enhancing the sound insulating property over a wide range of temperature from 0° C. to 40° C. Moreover, the present invention is also aimed at providing laminated glass prepared with the interlayer film for laminated glass.

The present invention is further aimed at providing an interlayer film for laminated glass capable of enhancing the sound insulating property over a wide range of temperature from 0° C. to 50° C.

Means for Solving the Problems

According to a wide aspect of the present invention, there is provided an interlayer film for laminated glass (hereinafter, also referred to as an interlayer film) having a one-layer structure or a two or more-layer structure, the interlayer film including a resin layer, the interlayer film having a ratio of a first storage modulus G' at a peak temperature of a maximum peak of tan δ to a second storage modulus G' at a temperature 100° C. higher than the peak temperature of the maximum peak of tan δ of 50 or more and 500 or less in viscoelasticity measurement at a frequency of 1 Hz in a shearing mode.

In a specific aspect of the interlayer film according to the present invention, the interlayer film is an interlayer film for laminated glass, having a two or more-layer structure.

In a specific aspect of the interlayer film according to the present invention, a value of the maximum peak of tan δ is 2.0 or more.

In a specific aspect of the interlayer film according to the present invention, a primary loss factor is 0.15 or more over an entire temperature region of 0° C. or more and 40° C. or less in mechanical impedance measurement in conformity with ISO 16940 of the laminated glass X obtained through the following first, second and third steps.

First step: an interlayer film having a width of 25 mm and a length of 300 mm is prepared. Two sheets of clear float glass in conformity with JIS R3202 having a thickness of 2.0 mm, a width of 25 mm and a length of 300 mm are prepared. The interlayer film is sandwiched between the two sheets of clear float glass to give a laminate X.

Second step: the obtained laminate X is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate X to preliminary press-bonding.

Third step: the preliminarily press-bonded laminate X is subjected to press-bonding for 20 minutes under conditions of 135° C. and a pressure of 1.2 MPa in an autoclave to obtain a laminated glass X.

In a specific aspect of the interlayer film according to the present invention, a primary loss factor is 0.15 or more over an entire temperature region of 0° C. or more and 50° C. or less in mechanical impedance measurement in conformity with ISO 16940 of the laminated glass X.

In a specific aspect of the interlayer film according to the present invention, the peak temperature of the maximum peak of tan δ is −20° C. or more and 20° C. or less.

In a specific aspect of the interlayer film according to the present invention, the interlayer film includes, as the resin layer, a layer containing a cured product, and the cured product is a cured product of a photocurable compound or a moisture-curable compound.

In a specific aspect of the interlayer film according to the present invention, the cured product is a cured product of a photocurable compound.

In a specific aspect of the interlayer film according to the present invention, the interlayer film includes, as the resin layer, a layer containing a cured product, and the cured product is a cured product of a curable compound having a (meth)acryloyl group.

In a specific aspect of the interlayer film according to the present invention, the interlayer film includes, as the resin layer, a layer containing a resin that is different from a cured product of a photocurable compound, a cured product of a moisture-curable compound, and cured product of a curable compound having a (meth)acryloyl group.

In a specific aspect of the interlayer film according to the present invention, the interlayer film includes, as a first resin layer, the layer containing a cured product, and the interlayer film includes, as a second resin layer, a layer containing a resin that is different from a cured product of a photocurable compound, a cured product of a moisture-curable compound, and a cured product of a curable compound having a (meth)acryloyl group.

In a specific aspect of the interlayer film according to the present invention, the resin contained in the layer containing a resin is a polyvinyl acetal resin.

In a specific aspect of the interlayer film according to the present invention, the following first configuration and the following second configuration are satisfied when a sound transmission loss measurement including the following first, second, third, fourth, and fifth steps is conducted.

First configuration: sound transmission loss at 500 Hz or more and 1000 Hz or less satisfies the following formula (1).

$$y \geq 10.1 \ln(x) - 35 \qquad \text{Formula (1)}$$

In formula (1), x means frequency (Hz), and y means sound transmission loss (dB).

Second configuration: sound transmission loss at 5000 Hz or more and 10000 Hz or less satisfies the following formula (2).

$$y \geq 12.8 \ln(x) - 68 \qquad \text{Formula (2)}$$

In formula (2), x means frequency (Hz), and y means sound transmission loss (dB).

First step: an interlayer film having a length of 500 mm and a width of 500 mm is prepared. Two sheets of green glass having a thickness of 2 mm, a length of 500 mm and a width of 500 mm are prepared. The interlayer film is sandwiched between the two sheets of green glass to obtain a laminate Y.

Second step: the obtained laminate Y is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate Y to preliminary press-bonding.

Third step: the preliminarily press-bonded laminate Y is subjected to press-bonding for 20 minutes under conditions of 135° C. and a pressure of 1.2 MPa in an autoclave, and stored for 84 weeks in an environment at a room temperature of 23±2° C., and a humidity of 25±5% to obtain a laminated glass Y.

Fourth step: a reverberation room in conformity with ISO 10140-5 in which a first reverberation room serving as a sound source room, and a second reverberation room serving as a sound receiving room are connected is prepared. The obtained laminated glass Y is placed between the first reverberation room and the second reverberation room.

Fifth step: sound transmission loss at 20° C. is measured at a center frequency of ⅓ octave band by an intensity method in conformity with JIS A1441-1.

According to a broad aspect of the present invention, there is provided an interlayer film for laminated glass (hereinafter, also referred to as interlayer film) having a one-layer structure or a two or more-layer structure, the interlayer film including a resin layer, and satisfying the following first configuration and the following second configuration when a sound transmission loss measurement including the aforementioned first, second, third, fourth and fifth steps is conducted.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

According to a broad aspect of the present invention, there is provided a laminated glass including a first lamination glass member, a second lamination glass member, and an interlayer film for laminated glass, the interlayer film having a one-layer structure or a two or more-layer structure, the interlayer film including a resin layer, and having a ratio of a first storage modulus G' at a peak temperature of a maximum peak of tan δ to a second storage modulus G' at a temperature 100° C. higher than the peak temperature of the maximum peak of tan δ of 50 or more and 500 or less in viscoelasticity measurement at a frequency of 1 Hz in a shearing mode, and a primary loss factor of 0.15 or more over an entire temperature region of 0° C. or more and 40° C. or less in mechanical impedance measurement in conformity with ISO 16940 of the laminated glass.

According to a broad aspect of the present invention, there is provided a laminated glass including a first lamination glass member, a second lamination glass member, and an interlayer film for laminated glass, the laminated glass satisfying the following first configuration and the following second configuration when sound transmission loss measurement including the following first, second and third steps is conducted.

First configuration: sound transmission loss at 500 Hz or more and 1000 Hz or less satisfies the following formula (1).

$$y \geq 10.1 \ln(x) - 35 \qquad \text{Formula (1)}$$

In formula (1), x means frequency (Hz), and y means sound transmission loss (dB).

Second configuration: sound transmission loss at 5000 Hz or more and 10000 Hz or less satisfies the following formula (2).

$$y \geq 12.8 \ln(x) - 68 \quad \text{Formula (2)}$$

In formula (2), x means frequency (Hz), and y means sound transmission loss (dB).

First step: a laminated glass having a length of 500 mm and a width of 500 mm is prepared.

Second step: a reverberation room in conformity with ISO 10140-5 in which a first reverberation room serving as a sound source room, and a second reverberation room serving as a sound receiving room are connected is prepared. The laminated glass having a length of 500 mm and a width of 500 mm is placed between the first reverberation room and the second reverberation room.

Third step: sound transmission loss at 20° C. is measured at a center frequency of ⅓ octave band by an intensity method in conformity with JIS A1441-1.

Effect of the Invention

The interlayer film for laminated glass according to the present invention has a one-layer structure or a two or more-layer structure. The interlayer film for laminated glass according to the present invention includes a resin layer. In viscoelasticity measurement at a frequency of 1 Hz in a shearing mode of the interlayer film for laminated glass according to the present invention, a ratio of a first storage modulus G' at a peak temperature of a maximum peak of tan δ to a second storage modulus G' at a temperature 100° C. higher than the peak temperature of the maximum peak of tan δ is 50 or more and 500 or less. In the interlayer film for laminated glass according to the present invention, since the aforementioned configuration is provided, it is possible to enhance the sound insulating property over a wide range of temperature from 0° C. to 40° C. In the interlayer film for laminated glass according to the present invention, since the aforementioned configuration is provided, it is also possible to enhance the sound insulating property over a wide range of temperature from 0° C. to 50° C. When the interlayer film for laminated glass according to the present invention is used in a vehicle or the like, it is also possible to enhance the sound insulating property against the running noises such as engine noise and road noise because the interlayer film for laminated glass according to the present invention is provided with the aforementioned configuration.

The interlayer film for laminated glass according to the present invention has a one-layer structure or a two or more-layer structure. The interlayer film for laminated glass according to the present invention includes a resin layer. In the interlayer film for laminated glass according to the present invention, the aforementioned first configuration and the aforementioned second configuration are satisfied when a sound transmission loss measurement including the aforementioned first, second, third, fourth and fifth steps is conducted. In the interlayer film for laminated glass according to the present invention, since the aforementioned configuration is provided, it is possible to enhance the sound insulating property over a wide range of temperature from 0° C. to 40° C. In the interlayer film for laminated glass according to the present invention, since the aforementioned configuration is provided, it is also possible to enhance the sound insulating property over a wide range of temperature from 0° C. to 50° C. When the interlayer film for laminated glass according to the present invention is used in a vehicle or the like, it is also possible to enhance the sound insulating property against the running noises such as engine noise and road noise because the interlayer film for laminated glass according to the present invention is provided with the aforementioned configuration.

The laminated glass according to the present invention includes a first lamination glass member, a second lamination glass member and an interlayer film for laminated glass. In the laminated glass according to the present invention, the interlayer film has a one-layer structure or a two or more-layer structure. In the laminated glass according to the present invention, the interlayer film includes a resin layer. In the laminated glass according to the present invention, the interlayer film has a ratio of a first storage modulus G' at a peak temperature of a maximum peak of tan δ to a second storage modulus G' at a temperature 100° C. higher than the peak temperature of the maximum peak of tan δ of 50 or more and 500 or less in viscoelasticity measurement at a frequency of 1 Hz in a shearing mode. In mechanical impedance measurement in conformity with ISO 16940 of the laminated glass according to the present invention, a primary loss factor is 0.15 or more over an entire temperature region of 0° C. or more and 40° C. or less. In the laminated glass according to the present invention, since the aforementioned configuration is provided, it is possible to enhance the sound insulating property over a wide range of temperature including 0° C. to 40° C. In the laminated glass according to the present invention, since the aforementioned configuration is provided, it is also possible to enhance the sound insulating property over a wide range of temperature including 0° C. to 50° C. When the laminated glass according to the present invention is used in a vehicle or the like, it is also possible to enhance the sound insulating property against the running noises such as engine noise and road noise because the laminated glass according to the present invention is provided with the aforementioned configuration.

The laminated glass according to the present invention includes a first lamination glass member, a second lamination glass member and an interlayer film for laminated glass. In the laminated glass according to the present invention, the aforementioned first configuration and the aforementioned second configuration are satisfied when a sound transmission loss measurement including the aforementioned first, second and third steps is conducted. In the laminated glass according to the present invention, since the aforementioned configuration is provided, it is possible to enhance the sound insulating property over a wide range of temperature including 0° C. to 40° C. In the laminated glass according to the present invention, since the aforementioned configuration is provided, it is also possible to enhance the sound insulating property over a wide range of temperature including 0° C. to 50° C. When the laminated glass according to the present invention is used in a vehicle or the like, it is also possible to enhance the sound insulating property against the running noises such as engine noise and road noise because the laminated glass according to the present invention is provided with the aforementioned configuration.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODES FOR CARRYING OUT THE INVENTION

Hereinafter, the present invention will be described in detail.

(Interlayer Film for Laminated Glass)

The interlayer film for laminated glass according to the present invention (hereinafter, sometimes described as interlayer film) has a one-layer structure or a two or more-layer structure. The interlayer film according to the present invention may have a one-layer structure and may have a two or more-layer structure. The interlayer film according to the present invention includes a resin layer. The interlayer film according to the present invention may have only one resin layer, or two or more resin layers. The interlayer film according to the present invention includes at least one resin layer. The interlayer film according to the present invention may be a single-layered interlayer film having a one-layer structure and may be a multi-layered interlayer film having a two or more-layer structure.

The interlayer film according to the present invention has a ratio of a first storage modulus G' at a peak temperature of a maximum peak of tan δ to a second storage modulus G' at a temperature 100° C. higher than the peak temperature of the maximum peak of tan δ (first storage modulus G'/second storage modulus G') of 50 or more and 500 or less in viscoelasticity measurement at a frequency of 1 Hz in a shearing mode of the interlayer film.

In the interlayer film according to the present invention, since the aforementioned configuration is provided, it is possible to enhance the sound insulating property over a wide range of temperature including 0° C. to 40° C. For example, it is possible to enhance the sound insulating property not at only one of temperatures selected, for example, from 0° C., 10° C., 20° C., 30° C. and 40° C., but at all of these five temperatures. Further, in the interlayer film according to the present invention, since the aforementioned configuration is provided, it is also possible to enhance the sound insulating property over a wide range of temperature including 0° C. to 50° C. For example, it is possible to enhance the sound insulating property not at only one of temperatures selected, for example, from 0° C., 10° C., 20° C., 30° C., 40° C., and 50° C. but at all of these six temperatures. Therefore, in the interlayer film according to the present invention, it is possible to exert high sound insulating property even when a laminated glass prepared with the interlayer film is used in various temperature environments.

From the viewpoint of further enhancing the sound insulating property over a wide range of temperature, and from the viewpoint of further enhancing the sound insulating property against the running noise such as engine noise and road noise, the ratio (first storage modulus G'/second storage modulus G') is preferably 60 or more, and preferably 450 or less, more preferably 400 or less, further preferably 300 or less, and especially preferably 250 or less. When the ratio (first storage modulus G'/second storage modulus G') is the above lower limit or more and the above upper limit or less, the sound insulating property in a low frequency region of 250 Hz or more and 1000 Hz or less is further enhanced, and the engine noise is further reduced.

From the viewpoint of effectively enhancing the sound insulating property over a wide range of temperature, the first storage modulus G' is preferably $1 \times 10^5$ Pa or more. From the viewpoint of effectively enhancing the sound insulating property over a wide range of temperature, the first storage modulus G' is preferably $1 \times 10^8$ Pa or less, and more preferably $1 \times 10^7$ Pa or less. When a value of the maximum peak of tan δ is 2.0 or more, and the first storage modulus G' is the above lower limit or more, the sound insulating property in a high frequency region of 5000 Hz to 10000 Hz is further enhanced, and the road noise is reduced.

The viscoelasticity measurement is specifically conducted in the following manner. Directly after storing a test piece in an environment at a room temperature of 23±2° C., and a humidity of 25±5% for 84 weeks or more, the viscoelasticity is measured by using a dynamic viscoelasticity measuring device. The measurement is conducted in the condition of raising the temperature from −50° C. to 200° C. at a temperature rising speed of 3° C./min. in a shearing mode, and in the condition of a frequency of 1 Hz and a strain of 1%.

Examples of the dynamic viscoelasticity measuring device include a viscoelasticity analyzer "DVA-200" available from IT Keisoku Seigyo Co., Ltd., and the like.

For example, when the thickness of the interlayer film is 0.3 mm or more and 2 mm or less, it is possible to easily measure the viscoelasticity by directly using the interlayer film as a test piece. When the thickness of the interlayer film is less than 0.3 mm, the viscoelasticity may be measured using a test piece having a thickness of 0.3 mm or more and 2 mm or less by stacking a plurality of the interlayer films, or separately preparing an interlayer film in which only the thickness is adjusted. When the thickness of the interlayer film is more than 2 mm, the viscoelasticity may be measured using a test piece having a thickness of 0.3 mm or more and 2 mm or less by slicing or pressing the interlayer film, or separately preparing an interlayer film in which only the thickness is adjusted.

In the case of a laminated glass, the test piece for viscoelasticity measurement may be obtained in the following manner. Two PET films are prepared. After cooling a laminated glass with liquid nitrogen or the like, the lamination glass members and the interlayer film are delaminated. The delaminated interlayer film is sandwiched between the two PET films to obtain a laminate. After press-bonding the obtained laminate in an autoclave, the laminate is stored in an environment at a room temperature of 23±2° C., and a humidity of 25±5% for 84 weeks or more to give a test piece.

From the viewpoint of further enhancing the sound insulating property over a wide range of temperature, and from the viewpoint of further enhancing the sound insulating property against the running noise such as engine noise and road noise, the peak temperature of the maximum peak of tan δ is preferably −30° C. or more, more preferably −25° C. or more, and further preferably −20° C. or more. From the viewpoint of further enhancing the sound insulating property over a wide range of temperature, and from the viewpoint of further enhancing the sound insulating property against the running noise such as engine noise and road noise, the peak temperature of the maximum peak of tan δ is preferably 20° C. or less, more preferably 10° C. or less and further preferably 0° C. or less.

The maximum peak value of tan δ is preferably 2.0 or more, more preferably 2.2 or more, still more preferably 2.4 or more, further preferably 2.5 or more, still further preferably 2.6 or more, especially preferably 2.8 or more, and most preferably 3.0 or more. When the maximum peak value of tan δ is the above lower limit or more, it is possible to effectively enhance the sound insulating property over a wider range of temperature, and it is possible to further enhance the sound insulating property against the running noise such as engine noise and road noise. The upper limit of tan δ at the peak temperature of tan δ is not limited. The maximum peak value of tan δ may be 6 or less.

From the viewpoint of further enhancing the sound insulating property over a wide range of temperature, it is preferred that a primary loss factor be 0.15 or more over an entire temperature region of 0° C. or more and 40° C. or less in mechanical impedance measurement in conformity with ISO 16940 of the laminated glass X obtained through the following first, second and third steps.

From the viewpoint of further enhancing the sound insulating property over a wide range of temperature, it is preferred that a primary loss factor be 0.15 or more over an entire temperature region of 0° C. or more and 50° C. or less in mechanical impedance measurement in conformity with ISO 16940 of the laminated glass X obtained through the following first, second and third steps.

First step: an interlayer film having a width of 25 mm and a length of 300 mm is prepared. Two sheets of clear float glass in conformity with JIS R3202 having a thickness of 2.0 mm, a width of 25 mm and a length of 300 mm are prepared. The interlayer film is sandwiched between the two sheets of clear float glass to give a laminate X.

Second step: the obtained laminate X is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate X to preliminary press-bonding.

Third step: the preliminarily press-bonded laminate X is subjected to press-bonding for 20 minutes under conditions of 135° C. and a pressure of 1.2 MPa in an autoclave to obtain a laminated glass X.

From the viewpoint of effectively enhancing the sound insulating property over a wide range of temperature, and from the viewpoint of further enhancing the sound insulating property against the running noise such as engine noise and road noise, it is preferred that the following first configuration and the following second configuration be satisfied when a sound transmission loss measurement including the following first, second, third, fourth and fifth steps is conducted.

First configuration: sound transmission loss at 500 Hz or more and 1000 Hz or less satisfies the following formula (1).

$$y \geq 10.1 \ln(x) - 35 \qquad \text{Formula (1)}$$

In formula (1), x means frequency (Hz), and y means sound transmission loss (dB).

Second configuration: sound transmission loss at 5000 Hz or more and 10000 Hz or less satisfies the following formula (2).

$$y \geq 12.8 \ln(x) - 68 \qquad \text{Formula (2)}$$

In formula (2), x means frequency (Hz), and y means sound transmission loss (dB).

First step: an interlayer film having a length of 500 mm and a width of 500 mm is prepared. Two sheets of green glass having a thickness of 2 mm, a length of 500 mm and a width of 500 mm are prepared. The interlayer film is sandwiched between the two sheets of green glass to obtain a laminate Y.

Second step: the obtained laminate Y is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate Y to preliminary press-bonding.

Third step: the preliminarily press-bonded laminate Y is subjected to press-bonding for 20 minutes under conditions of 135° C. and a pressure of 1.2 MPa in an autoclave, and stored for 84 weeks in an environment at a room temperature of 23±2° C., and a humidity of 25±5% to obtain a laminated glass Y.

Fourth step: a reverberation room in conformity with ISO 10140-5 in which a first reverberation room serving as a sound source room, and a second reverberation room serving as a sound receiving room are connected is prepared. The obtained laminated glass Y is placed between the first reverberation room and the second reverberation room.

Fifth step: sound transmission loss at 20° C. is measured at a center frequency of ⅓ octave band by an intensity method in conformity with JIS A1441-1.

The sound transmission loss at 20° C. in the fifth step can be measured, for example, by using a sound transmission loss measuring device available from RION Co., Ltd. "Intensity Probe SI-50, Multichannel Analyzer SA-02".

The interlayer film in laminated glass may be delaminated from the lamination glass members to prepare the aforementioned laminated glass Y. For example, the interlayer film may be delaminated from the lamination glass members by cooling the laminated glass with liquid nitrogen or the like, and the obtained interlayer film may be subjected to the aforementioned first, second and third steps to obtain a laminated glass Y, and the obtained laminated Y may be subjected to the aforementioned fourth and fifth steps. For example, when the lamination glass members of the laminated glass have a thickness of 2 mm, and the size of the laminated glass is a width of 500 mm or more and a length of 500 mm or more, the center part may be cut to have a width of 500 mm and a length of 500 mm.

From the viewpoint of effectively enhancing the sound insulating property over a wide range of temperature, and from the viewpoint of further enhancing the sound insulating property against the running noise such as engine noise and road noise, it is preferred that the interlayer film include a layer containing a cured product (first resin layer) as the resin layer. From the viewpoint of effectively enhancing the sound insulating property over a wide range of temperature, and from the viewpoint of further enhancing the sound insulating property against the running noise such as engine noise and road noise, it is preferred that the cured product be a cured product of a photocurable compound or a moisture-curable compound. From the viewpoint of effectively enhancing the sound insulating property over a wide range of temperature, and from the viewpoint of further enhancing the sound insulating property against the running noise such as engine noise and road noise, the cured product is a cured product of a curable compound having a (meth)acryloyl group.

The curable compound may be a photocurable compound or a moisture-curable compound, or may be a curable compound having a (meth)acryloyl group. The curable compound having a (meth)acryloyl group may be a photocurable compound or may be a moisture-curable compound, or may be a curable compound that is different from both the photocurable compound and the moisture-curable compound. In general, since a curable compound having a (meth)acryloyl group has a (meth)acryloyl group, the compound cures by irradiation with light.

From the viewpoint of enhancing the uniformity of curing of the layer containing a cured product and further enhancing the sound insulating property over a wide range of temperature, and from the viewpoint of further enhancing the sound insulating property against the running noise such as engine noise and road noise, the curable compound is preferably a photocurable compound, and preferably a curable compound having a (meth)acryloyl group. From the viewpoint of enhancing the uniformity of curing of the layer containing a cured product and further enhancing the sound insulating property over a wide range of temperature, and from the viewpoint of further enhancing the sound insulating property against the running noise such as engine noise and road noise, the cured product is preferably a (meth)acrylic polymer.

From the viewpoint of effectively enhancing the sound insulating property over a wide range of temperature, and from the viewpoint of further enhancing the sound insulating property against the running noise such as engine noise and road noise, it is preferred that the interlayer film include a layer containing a resin that is different from a cured product of a photocurable compound, a cured product of a moisture-curable compound, and a cured product of a curable compound having a (meth)acryloyl group (second resin layer) as the resin layer. The resin in the second resin layer is different from a cured product of a photocurable compound, and is different from a cured product of a moisture-curable compound, and is different from a cured product of a curable compound having a (meth)acryloyl group.

The interlayer film according to the present invention may have a one-layer structure, a two-layer structure, a two or more-layer structure, a three-layer structure, a three or more-layer structure, a four-layer structure, a four or more-layer structure, a five-layer structure, or a five or more-layer structure.

The interlayer film according to the present invention may include, a first layer, and a second layer arranged on a first surface side of the first layer. In this case, it is preferred that the first layer be the layer containing a cured product.

From the viewpoint of effectively enhancing the sound insulating property and adhesivity between layers, the interlayer film according to the present invention may include a first layer, and a second layer arranged on a first surface side of the first layer, and may further include a third layer arranged on a second surface side opposite to the first surface side of the first layer. In this case, it is preferred that the first layer be the layer containing a cured product.

From the viewpoint of effectively enhancing the sound insulating property and adhesivity between layers, the interlayer film according to the present invention may further include a fourth layer arranged on a side opposite to the first layer side of the second layer, and may further include a fifth layer arranged on a side opposite to the first layer side of the third layer. In this case, it is preferred that the first layer, the second layer or the third layer be the layer containing a cured product. It is more preferred that the first layer be the layer containing a cured product.

From the viewpoint of effectively enhancing the sound insulating property and adhesivity between the interlayer film and glass, it is preferred that the layer containing a cured product be not a surface layer in the interlayer film, and it is preferred that the layer containing a cured product be an intermediate layer in the interlayer film. It is to be noted that the layer containing a cured product may be a surface layer in the interlayer film.

From the viewpoint of enhancing the transparency of the laminated glass, the visible light transmittance of the interlayer film is preferably 70% or more, more preferably 80% or more, further preferably 85% or more.

The visible light transmittance is measured at a wavelength ranging from 380 to 780 nm by using a spectrophotometer ("U-4100" available from Hitachi High-Tech Corporation) in conformity with JIS R3211:1998.

The visible light transmittance of the interlayer film may be measured while the interlayer film is arranged between two sheets of clear glass. It is preferred that the clear glass have a thickness of 2.0 mm.

Hereinafter, specific embodiments of the present invention will be described with reference to the drawings.

FIG. 1 is a sectional view schematically showing an interlayer film for laminated glass in accordance with a first embodiment of the present invention.

An interlayer film 11 shown in FIG. 1 is a multi-layered interlayer film having a two or more-layer structure. Specifically, the interlayer film 11 has a three-layer structure. The interlayer film 11 is used for obtaining laminated glass. The interlayer film 11 is an interlayer film for laminated glass. The interlayer film 11 is provided with a first layer 1, a second layer 2 and a third layer 3. The second layer 2 is arranged on a first surface 1a side of the first layer 1 to be layered thereon. The third layer 3 is arranged on a second surface 1b side opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (second layer 2/first layer 1/third layer 3) in which the second layer 2, the first layer 1, and the third layer 3 are layered in this order.

In the interlayer film 11, it is preferred that the first layer 1 be the layer containing a cured product. The second layer 2 may be the layer containing a cured product, or the third layer 3 may be the layer containing a cured product.

In this connection, other layers may be arranged between the second layer 2 and the first layer 1 and between the first layer 1 and the third layer 3, respectively. It is preferred that the second layer 2 and the first layer 1, and the first layer 1 and the third layer 3 be directly layered. As the other layer, an adhesive layer can be recited.

FIG. 2 is a sectional view schematically showing an interlayer film for laminated glass in accordance with a second embodiment of the present invention.

An interlayer film 11A shown in FIG. 2 is a multi-layered interlayer film having a two or more-layer structure. Specifically, the interlayer film 11A has a five-layer structure. The interlayer film 11A is used for obtaining laminated glass. The interlayer film 11A is an interlayer film for laminated glass. The interlayer film 11A includes a first layer 1A, a second layer 2A, a third layer 3A, a fourth layer 4A, and a fifth layer 5A. The second layer 2A is arranged on a first surface 1a side of the first layer 1A to be layered thereon. The third layer 3A is arranged on a second surface 1b side opposite to the first surface 1a of the first layer 1A to be layered thereon. The fourth layer 4A is arranged on a side opposite to the first layer 1A side of the second layer 2A to be layered thereon. The fifth layer 5A is arranged on a side opposite to the first layer 1A side of the third layer 3A to be layered thereon. Each of the first layer 1A, the second layer 2A and the third layer 3A is an intermediate layer. Each of the fourth layer 4A and the fifth layer 5A is a protective layer and is a surface layer in the present embodiment. The first layer 1A is arranged between the second layer 2A and the third layer 3A to be sandwiched therebetween. The laminate of the first layer 1A, the second layer 2A and the third layer 3A is arranged between the fourth layer 4A and the fifth layer 5A to be sandwiched therebetween. Therefore, the interlayer film 11A has such a multilayer structure that the fourth layer 4A, the second layer 2A, the first layer 1A, the third layer 3A, and the fifth layer 5A are laminated in this sequence (fourth layer 4A/second layer 2A/first layer 1A/third layer 3A/fifth layer 5A).

In the interlayer film 11A, it is preferred that the first layer 1A, the second layer 2A or the third layer 3A be the layer containing a cured product, and it is more preferred that the first layer 1A be the layer containing a cured product. The fourth layer 4A may be the layer containing a cured product, or the fifth layer 5A may be the layer containing a cured product.

Between the fourth layer 4A and the second layer 2A, between the second layer 2A and the first layer 1A, between the first layer 1A and the third layer 3A, and between the third layer 3A and the fifth layer 5A, respectively, other layer may be arranged. It is preferred that the fourth layer 4A and the second layer 2A, the second layer 2A and the first layer 1A, the first layer 1A and the third layer 3A, and the third layer 3A and the fifth layer 5A, respectively be layered directly. As the other layer, an adhesive layer can be recited.

Hereinafter, the details of the interlayer film according to the present invention, the resin layer (layer containing a cured product (first resin layer)), the layer containing a resin (second resin layer), the first layer, the second layer, the third layer, the fourth layer, and the fifth layer, and the details of ingredients used in the interlayer film will be described.

(Resin Layer)

The interlayer film includes a resin layer.

The resin layer contains a resin. Examples of the resin include cured resins (cured products), thermoplastic resins, and the like. The thermoplastic resin may be a thermoplastic elastomer. The thermoplastic resin means a resin that softens and exhibits plasticity when it is heated, and hardens when it is cooled to room temperature. The thermoplastic elastomer means, in particular, a resin that softens and exhibits plasticity when it is heated, and hardens to exhibit rubber elasticity when it is cooled to room temperature (25° C.) among thermoplastic resins. Examples of the thermoplastic resin include a polyolefin resin, a vinyl acetate resin, an ethylene-vinyl acetate resin, a polyester resin, a polyvinyl acetal resin, modified resins of these resins, and the like. The cured resin is a cured product of a curable compound. Examples of the curable compound include a photocurable compound, a moisture-curable compound, a thermosetting compound, and the like. The resin may be a cured product of a photocurable compound or a moisture-curable compound. The cured product of a photocurable compound or a moisture-curable compound can be a thermoplastic resin. Thermoplastic resins other than these may be used. The thermoplastic resins exemplified above can be a thermoplastic elastomer by adjusting the molecular structure, the polymerization degree and the like of the resin.

From the viewpoint of further enhancing the sound insulating property over a wide range of temperature, and from the viewpoint of further enhancing the sound insulating property against the running noise such as engine noise and road noise, it is preferred that the interlayer film include the layer containing a cured product (first resin layer) as the resin layer. The interlayer film may include only the first resin layer as the resin layer. The interlayer film may include only one layer or two or more layers containing a cured product (first resin layer).

It is preferred that the interlayer film include a layer containing a resin (second resin layer) that is different from a cured product of a photocurable compound, a cured product of a moisture-curable compound, and a cured product of a curable compound having a (meth)acryloyl group. The second resin layer is a resin layer that is different from the layer containing a cured product (first resin layer). The interlayer film may include only the second resin layer as the resin layer. The interlayer film may include only one layer or two or more layers containing a resin (second resin layer).

It is preferred that the interlayer film include the layer containing a cured product (first resin layer), and the layer containing a resin (second resin layer). In this case, the interlayer film may include only one layer or two or more layers of each of the first resin layer, and the second resin layer.

In 100% by weight of the composition for forming the resin layer, the content of the resin is preferably 50% by weight or more, more preferably 60% by weight or more, further preferably 70% by weight or more, and especially preferably 80% by weight or more. When the content of the resin is the above lower limit or more, it is possible to further exert the effect of the present invention. The content of the resin in 100% by weight of the composition for forming the resin layer may be 100% by weight (total quantity).

<Curable Compound for Forming Cured Product in Layer Containing Cured Product (First Resin Layer), and Cured Product>

From the viewpoint of further enhancing the sound insulating property over a wide range of temperature, and from the viewpoint of further enhancing the sound insulating property against the running noise such as engine noise and road noise, it is preferred that the interlayer film include the layer containing a cured product (first resin layer). It is preferred that the curable compound for forming the cured product in the layer containing a cured product be a photocurable compound or a moisture-curable compound. The interlayer film need not include the first resin layer as the resin layer.

The curable compound is preferably a curable compound having a (meth)acryloyl group, and is more preferably a (meth)acrylic polymer. The (meth)acrylic polymer may contain other resin component. It is preferred that the resin component be a polyvinyl acetal resin.

It is preferred that the (meth)acrylic polymer be a polymer of a polymerizable composition containing a curable compound having a (meth)acryloyl group. The polymerizable composition contains a polymerizable component. In order to effectively form the cured product in the layer containing the cured product, the polymerizable composition may contain a photoreaction initiator. The polymerizable composition may contain an auxiliary for accelerating the curing reaction together with the photoreaction initiator. The polymerizable composition may contain a resin component such as a polyvinyl acetal resin. Representatives of the curable compound having a (meth)acryloyl group include (meth)acrylic ester. It is preferred that the (meth)acrylic polymer be a poly(meth)acrylic ester.

For effectively obtaining the effect of the present invention, it is preferred that the polymerizable component include a (meth)acrylic ester having an alicyclic structure, a (meth)acrylic ester having a cyclic ether structure, a (meth)acrylic ester having an aromatic ring, a (meth)acrylic ester having a polar group, or an acyclic (meth)acrylic ester having 6 or less carbon atoms in the side chain. By using such a preferred (meth)acrylic ester, it is possible to enhance both the sound insulating property and the ability to prevent foaming in good balance.

Examples of the (meth)acrylic ester having an alicyclic structure include isobornyl (meth)acrylate, cyclohexyl (meth)acrylate, dicyclopentanyl acrylate, and the like.

Examples of the (meth)acrylic ester having a cyclic ether structure include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl, 6-hydroxyhexyl (meth)acrylate glycidyl ether; (3-methyloxetan-3-yl)methyl (meth)acrylate, (3-propyloxetan-3-yl)methyl (meth)acrylate, (3-ethyloxetan-3-yl)methyl (meth)acrylate, (3-butyloxetan-3-yl)methyl (meth)acrylate, (3-ethyloxetan-3-yl)ethyl (meth)acrylate, (3-ethyloxetan-3-yl)propyl (meth)acrylate, (3-ethyloxetan-3-yl)butyl (meth)acrylate, (3-ethyloxetan-3-yl)pentyl (meth)acrylate, (3-ethyloxetan-3-yl)hexyl (meth)acrylate; tetrahydrofurfuryl (meth)acrylate, (2,2-dimethyl-1,3-dioxolan-4-yl)methyl (meth)acrylate, (2-methyl-2-ethyl-1,3-dioxolan-4-yl)methyl (meth)acrylate, (2-methyl-2-isobutyl-1,3-dioxolan-4-yl)methyl (meth)acrylate, (2-cyclohexyl-1,3-dioxolan-4-yl)methyl (meth)acrylate, tetrahydrofurfuryl alcohol acrylic acid multimer ester; tetrahydro-2H-pyran-2-yl-(meth)acrylate, 2-{1-[(tetrahydro-2H-pyran-2-yl)oxy]-2-methylpropyl}(meth)acrylate, cyclic trimethylol propane formal acrylate, (meth)acryloyl morpholine, and the like. From the viewpoint of effectively obtaining the effect of the present invention, tetrahydrofurfuryl (meth)acrylate, or cyclic trimethylol propane formal acrylate is especially preferred.

Examples of the (meth)acrylic ester having an aromatic ring include benzyl acrylate, phenoxypolyethyleneglycol acrylate, and the like.

Examples of the (meth)acrylic ester having a polar group include (meth)acrylic esters having a hydroxyl group, an amide group, an amino group, an isocyanate group, a carboxyl group or the like as the polar group.

Examples of the (meth)acrylic ester having a hydroxyl group include 2-hydroxyethyl (meth)acrylate, hydroxypropyl (meth)acrylate, 4-hydroxybutyl (meth)acrylate, 2-hydroxybutyl (meth)acrylate, and the like.

Examples of the (meth)acrylic ester having an amide group include N,N-dimethylaminopropyl (meth)acrylamide, N,N-dimethyl (meth)acrylamide, (meth)acryloyl morpholine, N-isopropyl (meth)acrylamide, N-hydroxyethyl (meth)acrylamide, and the like.

Examples of the (meth)acrylic ester having an amide group or an amino group include N-dialkylaminoalkyl (meth)acrylamide, N,N-dialkylaminoalkyl (meth)acrylamide, and the like.

Examples of the (meth)acrylic ester having an isocyanate group include triallylisocyanurate, derivatives thereof, and the like.

Examples of the (meth)acrylic ester having a carboxyl group include acrylic acid, ω-carboxy-polycaprolactone monoacrylate, 2-acryloyloxyethylsuccinic acid, and the like.

The above-described (meth)acrylic ester may be a polycarboxylic ester having a (meth)acryloyl group. Examples of the polycarboxylic ester having a (meth)acryloyl group include 2-acryloyloxyethyl succinate, and the like.

From the viewpoint of effectively obtaining the effect of the present invention, a (meth)acrylic ester having a hydroxyl group is preferred, and 2-hydroxyethyl (meth)acrylate, hydroxypropyl (meth)acrylate, or 4-hydroxybutyl (meth)acrylate is especially preferred.

Examples of the acyclic (meth)acrylic ester having 6 or less carbon atoms in the side chain include methyl (meth)acrylate, ethyl (meth)acrylate, propyl (meth)acrylate, butyl (meth)acrylate, and the like.

For effectively obtaining the effect of the present invention, it is preferred that the content of the acyclic (meth)acrylic ester having 8 or more carbon atoms in the side chain in 100% by weight of the polymerizable component be less than 20% by weight.

Examples of the (meth)acrylic ester include besides the compounds as recited above, diethyleneglycol monoethylether (meth)acrylate, 3-methoxybutyl (meth)acrylate, 2-acryloyloxyethyl-2-hydroxypropylphthalate, 2-acryloyloxyethyl-2-hydroxylpropylphthalate, ethylene glycol di(meth)acrylate, diethylene glycol di(meth)acrylate, tetraethylene glycol di(meth)acrylate, 1,6-hexane diol di(meth)acrylate, 1,9-nonane diol di(meth)acrylate, polytetramethylene glycol di(meth)acrylate, neopentyl glycol di(meth)acrylate, 1,3-butylene glycol di(meth)acrylate, 2,2-bis[4-(acryloxyethoxy)phenyl]propane di(meth)acrylate; trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tri(2-acryloyloxyethyl)phosphate, tetramethylol methane tri(meth)acrylate, tetramethylol propane tetra(meth)acrylate, derivatives thereof, and the like.

One kind of the (meth)acrylic ester may be used alone, and two or more kinds thereof may be used in combination. The above-described (meth)acrylic polymer may be a homopolymer of the above-described (meth)acrylic ester, or may be a copolymer of a polymerizable component containing the above-described (meth)acrylic ester.

Concrete examples of the photoreaction initiator include 2-methyl-1-(4-methylthiophenyl)-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, bis(η5-2,4-cyclopentadien-1-yl)-bis(2,6-difluoro-3-(1H-pyrrol-1-yl)-phenyl)titanium, 2-methyl-1-(4-methylthiophenyl)-2-morpholinopropan-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, diethoxyacetophenone, 2-hydroxy-2-methyl-1-phenylpropan-1-one, benzyldimethylketal, 4-(2-hydroxyethoxy)phenyl-(2-hydroxy-2-propyl)ketone, 1-hydroxycyclohexylphenylketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl]propanone oligomer, benzoin, benzoin methyl ether, benzoin ethyl ether, benzoin isopropyl ether, benzoin isobutyl ether, benzophenone, methyl o-benzoylbenzoate, 4-phenylbenzophenone, 4-benzoyl-4'-methyl-diphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, (4-benzoylbenzyl)trimethylammonium chloride, 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthon-9-one methochloride, 2,4,6-trimethylbenzoyl-diphenylphosphine oxide, bis(2,6-dimethoxybenzoyl)-2,4,4-trimethyl-pentylphosphine oxide, bis(2,4,6- trimethylbenzoyl)-phenylphosphine oxide, triphenylmethylium tetrakis(pentafluorophenyl) borate, and the like. Only one kind of the photoreaction initiator may be used, and two or more kinds thereof may be used in combination.

Examples of the auxiliary include triethanol amine, triisopropanol amine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, and the like. One kind of the auxiliary may be used alone and two or more kinds thereof may be used in combination.

It is preferred that the auxiliary be benzyldimethylketal, 1-hydroxycyclohexylphenyl ketone, benzoylisopropyl ether, 4-(2-hydroxyethoxy)-phenyl(2-hydroxy-2-propyl) ketone, 2-hydroxy-2-methyl-1-phenylpropan-1-one, or triphenylmethylium tetrakis(pentafluorophenyl) borate.

In 100% by weight of the polymerizable composition, the content of the photoreaction initiator is preferably 0.01% by weight or more, more preferably 0.1% by weight or more and is preferably 10% by weight or less, more preferably 5% by weight or less. When the content of the photoreaction initiator is in the range from the above-described lower limit to the above-described upper limit, the photocurability and the storage stability further increase.

When the curable compound for forming the cured product in the layer containing a cured product is a photocurable compound such as a photocurable compound having a (meth)acryloyl group, it is preferred that a photocuring device such as an ultraviolet irradiation device be used to cure the photocurable compound. Examples of the ultraviolet irradiation device include a box-type ultraviolet irradiation device, a belt-conveyer-type ultraviolet irradiation device, and the like. Examples of the ultraviolet lamp installed in the ultraviolet irradiation device include a super-high-pressure mercury lamp, a high-pressure mercury lamp, a low-pressure mercury lamp, a chemical lamp, a metal halide lamp, an excimer lamp, a UV-LED, and the like. The ultraviolet lamp is preferably a chemical lamp or a UV-LED.

When the photocurable compound is irradiated with ultraviolet rays so as to obtain the cured product, the ultraviolet dose (cumulative dose) is preferably 500 mJ or more, more preferably 1000 mJ or more, further preferably 1500 mJ or more, and especially preferably 2000 mJ or more. The ultraviolet dose (cumulative dose) is preferably 20000 mJ or less, more preferably 10000 mJ or less, and further preferably 8000 mJ or less. When the ultraviolet dose (cumulative dose) is the above lower limit or more, it is possible to reduce the unreacted monomers. When the ultraviolet dose (cumulative dose) is the above lower limit or more, the storage stability of the resin increases. The irradiation intensity of the ultraviolet irradiation is preferably 0.1 mW or more, more preferably 0.5 mW or more, further preferably 1 mW or more, and especially preferably 2 mW or more.

In 100% by weight of the composition for forming the layer containing a cured product, the content of the cured product is preferably 50% by weight or more, more preferably 60% by weight or more, further preferably 70% by weight or more, and especially preferably 80% by weight or more. When the content of the cured product is the above lower limit or more, it is possible to further exert the effect of the present invention. The content of the cured product in 100% by weight of the composition for forming the layer containing a cured product may be 100% by weight (total quantity).

<Resin in Layer (Second Resin Layer) Containing Resin that is Different from Cured Product of Photocurable Compound, Cured Product of Moisture-Curable Compound, and Cured Product of a Curable Compound Having a (Meth)Acryloyl Group>

It is preferred that the interlayer film include a layer containing a resin (second resin layer) that is different from a cured product of a photocurable compound, a cured product of a moisture-curable compound, and a cured product of a curable compound having a (meth)acryloyl group. The second resin layer is a resin layer that is different from the layer containing a cured product (first resin layer). The interlayer film need not include the second resin layer as the resin layer.

Examples of the resin contained in the second resin layer include cured products of thermosetting compounds, thermoplastic resins, and the like. The thermoplastic resin may be a thermoplastic elastomer.

The thermoplastic resin means a resin that softens and exhibits plasticity when it is heated, and hardens when it is cooled to room temperature. The thermoplastic elastomer means, in particular, a resin that softens and exhibits plasticity when it is heated, and hardens to exhibit rubber elasticity when it is cooled to room temperature (25° C.) among thermoplastic resins.

Examples of the thermoplastic resin include a polyvinyl acetal resin, a polyester resin, an aliphatic polyolefin, polystyrene, an ethylene-vinyl acetate copolymer resin, an ethylene-acrylic acid copolymer resin, a polyurethane resin, an ionomer resin, a polyvinyl alcohol resin, a polyvinyl acetate resin, and the like. Thermoplastic resins other than these may be used.

The thermoplastic resins exemplified above can be a thermoplastic elastomer by adjusting the molecular structure, the polymerization degree and the like of the resin.

It is preferred that the surface layer in the interlayer film contain a thermoplastic resin. It is preferred that each of the second layer and the third layer in the interlayer film having a second layer/first layer/third layer structure contain a thermoplastic resin. It is preferred that each of the fourth layer and the fifth layer in the interlayer film having a fourth layer/second layer/first layer/third layer/fifth layer structure contain a thermoplastic resin.

It is preferred that each of the second layer and the third layer in the interlayer film having a fourth layer/second layer/first layer/third layer/fifth layer structure contain a thermoplastic resin.

From the viewpoint of enhancing the penetration resistance, it is preferred that the thermoplastic resin be a polyvinyl acetal resin, an ionomer resin or an ethylene-vinyl acetate copolymer resin. From the viewpoint of further enhancing the penetration resistance, a polyvinyl acetal resin is preferred.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70 to 99.9% by mole.

The average polymerization degree of the polyvinyl alcohol (PVA) is preferably 200 or more, more preferably 500 or more, still more preferably 1500 or more, further preferably 1600 or more, and is preferably 5000 or less, more preferably 4000 or less, further preferably 3500 or less, especially preferably 3000 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin fall within the range of 3 to 5 and it is more preferred that the number of carbon atoms of the acetal group be 3 or 4. When the number of carbon atoms of the acetal group in the polyvinyl acetal resin is 3 or more, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Propionaldehyde, n-butyraldehyde, isobutyraldehyde, n-hexylaldehyde, or n-valeraldehyde is preferred, propionaldehyde, n-butyraldehyde, or isobutyraldehyde is more preferred, and n-butyraldehyde is further preferred. One kind of the aldehyde may be used alone, and two or more kinds thereof may be used in combination.

The content of the hydroxyl group (the amount of hydroxyl groups) of the polyvinyl acetal resin is preferably 15% by mole or more, more preferably 18% by mole or more, and preferably 40% by mole or less, and more preferably 35% by mole or less. When the content of the hydroxyl group is the above lower limit or more, the adhesive force of the interlayer film is further enhanced. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in conformity with JIS K6728 "Testing methods for polyvinyl butyral".

The acetylation degree of the polyvinyl acetal resin is preferably 0.01% by mole or more, more preferably 0.5% by mole or more, and preferably 10% by mole or less, and more preferably 2% by mole or less. When the acetylation degree is the above lower limit or more, the compatibility between the polyvinyl acetal resin and a plasticizer is enhanced. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (the butyralization degree in the case of a polyvinyl butyral resin) is preferably 55% by mole or more, more preferably 60% by mole or more and is preferably 75% by mole or less, and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

(Tackifier Resin)

It is preferred that the interlayer film contain a tackifier resin. It is preferred that the layer containing a cured product (first resin layer) contain a tackifier resin. It is preferred that the layer containing a resin (second resin layer) contain a tackifier resin. It is preferred that the first layer contain a tackifier resin. One kind of the tackifier resin may be used alone and two or more kinds thereof may be used in combination.

Examples of the tackifier resin include a styrene resin, a terpene resin, and a rosin resin, and the like. From the viewpoint of enhancing the sound insulating property over a wide range of temperature while keeping haze satisfactorily, the tackifier resin is preferably a styrene resin. It is preferred that the styrene resin be an oligomer of styrene. One exemplary commercially available product of the oligomer of styrene is "YS resin SX100" available from YASUHARA CHEMICAL CO., LTD.

In the resin layer containing a tackifier resin, the content of the tackifier resin per 100 parts by weight of the resin excluding the tackifier resin contained in the resin layer is preferably 10 parts by weight or more, more preferably 20 parts by weight or more, further preferably 30 parts by weight or more, and is preferably 150 parts by weight or less, more preferably 100 parts by weight or less. When the content of the tackifier resin is the above lower limit or more, it is possible to enhance the sound insulating property over a wide range of temperature while keeping haze satisfactorily.

(Plasticizer)

It is preferred that the interlayer film contain a plasticizer. From the viewpoint of effectively enhancing the sound insulating property, it is preferred that the layer containing a cured product (first resin layer) contain a plasticizer. It is preferred that the layer containing a resin (second resin layer) contain a plasticizer. It is preferred that each of the first, second, third, fourth, and fifth layers contain a plasticizer. By using the plasticizer, adhesive force between layers tends to be further increased. One kind of the plasticizer may be used alone and two or more kinds thereof may be used in combination.

Examples of the plasticizer include paraffin oil, a benzoic ester plasticizer, an organic ester plasticizer, and an organic phosphate plasticizer, and the like. Examples of the organic ester plasticizer include a monobasic organic acid ester, a polybasic organic acid ester, and the like. Examples of the phosphate plasticizer include an organic phosphate plasticizer, an organic phosphite plasticizer, and the like. It is preferred that the plasticizer be a liquid plasticizer.

Examples of the paraffin oil include naphthenic process oil, white mineral oil, mineral oil, paraffin wax, liquid paraffin, and the like.

Examples of commercially available paraffin oil include "Diana process oil PW-90" available from Idemitsu Kosan Co., Ltd., "Diana process oil PW-100" available from Idemitsu Kosan Co., Ltd., "Diana process oil PW-32" available from Idemitsu Kosan Co., Ltd., and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dibutyl maleate, bis(2-butoxyethyl) adipate, dibutyl adipate, diisobutyl adipate, 2,2-butoxyethoxyethyl adipate, benzoic acid glycol ester, adipic acid 1,3-butyleneglycol polyester, dihexyl adipate, dioctyl adipate, hexyl cyclohexyl adipate, a mixture of heptyl adipate and nonyl adipate, diisononyl adipate, diisodecyl adipate, heptyl nonyl adipate, tributyl citrate, tributyl acetylcitrate, diethyl carbonate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic ester plasticizer include a diester plasticizer represented by the following structural formula (1).

[Chemical 1]

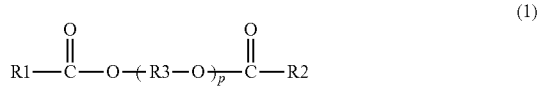

(1)

In the foregoing formula (1), R1 and R2 each represent an organic group with 2 to 10 carbon atoms, R3 represents an ethylene group, an isopropylene group, or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate or triethylene glycol di-2-ethylbutyrate, and it is further preferred that the plasticizer include triethylene glycol di-2-ethylhexanoate.

In the resin layer, the content of the plasticizer per 100 parts by weight of the resin is referred to as content (0). The content (0) is preferably 5 parts by weight or more, more preferably 10 parts by weight or more, and further preferably 20 parts by weight or more, and is preferably 60 parts by weight or less, and more preferably 50 parts by weight or less. When the content (0) is the above lower limit or more, it is possible to effectively enhance the sound insulating property. When the content (0) is the above upper limit or less, the penetration resistance of laminated glass is further enhanced.

In the layer containing a cured product (first resin layer), the content of the plasticizer per 100 parts by weight of the cured product is referred to as content (1). The content (1) is preferably 5 parts by weight or more, more preferably 10 parts by weight or more, and further preferably 20 parts by weight or more, and is preferably 60 parts by weight or less, and more preferably 50 parts by weight or less. When the content (1) is the above lower limit or more, it is possible to effectively enhance the sound insulating property. When the content (1) is the above upper limit or less, the penetration resistance of laminated glass is further enhanced.

In the layer containing a resin (second resin layer), the content of the plasticizer per 100 parts by weight of the resin is referred to as content (2). The content (2) is preferably 5 parts by weight or more, more preferably 10 parts by weight or more, and further preferably 20 parts by weight or more, and is preferably 60 parts by weight or less, and more preferably 50 parts by weight or less. When the content (2) is the above lower limit or more, it is possible to effectively enhance the sound insulating property. When the content of the plasticizer is the above upper limit or less, the penetration resistance of laminated glass is further enhanced.

(Heat Shielding Substance)

The interlayer film may contain a heat shielding substance. The resin layer may contain a heat shielding substance. The layer containing a resin may contain a heat shielding substance. Each of the first, second, third, fourth, and fifth layers may contain a heat shielding substance. One kind of the heat shielding substance may be used alone, and two or more kinds thereof may be used in combination.

The heat shielding substance may contain at least one kind of Ingredient X among a phthalocyanine compound, a naphthalocyanine compound, and an anthracyanine compound or contain heat shielding particles. In this case, the heat shielding substance may contain both of the Ingredient X and the heat shielding particles.

The interlayer film may contain at least one kind of Ingredient X among a phthalocyanine compound, a naphthalocyanine compound and an anthracyanine compound. The layer containing a cured product may contain the Ingredient X. The layer containing a resin may contain the Ingredient X. Each of the first, second, third, fourth, and fifth layers may contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

The Ingredient X may contain a vanadium atom or a copper atom. The Ingredient X may contain a vanadium atom, and may contain a copper atom. The Ingredient X may be at least one kind of phthalocyanines containing a vanadium atom or a copper atom, and derivatives of phthalocyanine containing a vanadium atom or a copper atom.

The interlayer film may contain heat shielding particles. The layer containing a cured product may contain heat shielding particles. The layer containing a resin may contain heat shielding particles. The first layer may contain heat shielding particles. The second layer may contain heat shielding particles. The third layer may contain heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

As the heat shielding particles, metal oxide particles may be used. As the heat shielding particles, particles formed of an oxide of metal (metal oxide particles) may be used.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used.

(Metal Salt)

The interlayer film may contain at least one kind of metal salt (hereinafter, also referred to as Metal salt M) among an alkali metal salt, an alkaline earth metal salt, and a magnesium salt. The layer containing a cured product may contain the Metal salt M. The layer containing a resin may contain the Metal salt M. Each of the first, second, third, fourth, and fifth layers may contain the Metal salt M. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

The Metal salt M may contain at least one kind of metal selected from the group consisting of Li, Na, K, Rb, Cs, Mg, Ca, Sr and Ba.

As the Metal salt M, an alkali metal salt of an organic acid having 2 to 16 carbon atoms, an alkali earth metal salt of an organic acid having 2 to 16 carbon atoms, or a magnesium salt of an organic acid having 2 to 16 carbon atoms can be used.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

(Ultraviolet Ray Screening Agent)

The interlayer film may contain an ultraviolet ray screening agent. The layer containing a cured product may contain an ultraviolet ray screening agent. The layer containing a resin may contain an ultraviolet ray screening agent. Each of the first, second, third, fourth, and fifth layers may contain an ultraviolet ray screening agent. By the use of an ultraviolet ray screening agent, even when the interlayer film and the laminated glass are used for a long period of time, the visible light transmittance becomes further hard to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'- hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazin-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

(Oxidation Inhibitor)

The interlayer film may contain an oxidation inhibitor. The layer containing a cured product may contain an oxidation inhibitor. The layer containing a resin may contain an oxidation inhibitor. Each of the first, second, third, fourth, and fifth layers may contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

(Other Ingredients)

Each of the interlayer film, the layer containing a cured product, the layer containing a resin, the first layer, the second layer, the third layer, the fourth layer, and the fifth layer may contain additives such as a coupling agent, a dispersing agent, a surfactant, a flame retardant, an antistatic agent, a pigment, a dye, an adhesive force regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film is designated as T. The thickness of the layer containing a cured product (thickness per one layer) is preferably 0.005T or more, more preferably 0.010T or more, and further preferably 0.020T or more, and is preferably 0.180T or less, and more preferably 0.120T or less. When the thickness of the layer containing a cured product (thickness per one layer) is the above lower limit or more and the above upper limit or less, it is possible to further enhance the sound insulating property over a wide range of temperature, and it is possible to further enhance the sound insulating property against the running noise such as engine noise and road noise.

The thickness of the layer containing a resin (thickness per one layer) is preferably 0.300T or more, more preferably 0.350T or more, and further preferably 0.400T or more, and is preferably 0.950T or less, and more preferably 0.900T or less. When the thickness of the layer containing a resin (thickness per one layer) is the above lower limit or more and the above upper limit or less, it is possible to further enhance the sound insulating property over a wide range of temperature, and it is possible to further enhance the sound insulating property against the running noise such as engine noise and road noise.

The thickness of the layer containing a cured product (thickness per one layer) is preferably 5 μm or more, more preferably 10 μm or more, and further preferably 20 μm or more, and is preferably 600 μm or less, more preferably 300 μm or less, further preferably 150 μm or less, and especially preferably 100 μm or less. When the thickness of the layer containing a cured product (thickness per one layer) is the above lower limit or more and the above upper limit or less, it is possible to further enhance the sound insulating property over a wide range of temperature, and it is possible to further enhance the sound insulating property against the running noise such as engine noise and road noise.

The thickness of the layer containing a resin (thickness per one layer) is preferably 200 μm or more, more preferably 300 μm or more, and further preferably 350 μm or more, and is preferably 1000 μm or less, and more preferably 850 μm or less. When the thickness of the layer containing a resin (thickness per one layer) is the above lower limit or more and the above upper limit or less, it is possible to further enhance the sound insulating property over a wide range of temperature, and it is possible to further enhance the sound insulating property against the running noise such as engine noise and road noise.

The interlayer film may be an interlayer film having a uniform thickness, or may be an interlayer film having varying thickness. The sectional shape of the interlayer film may be a rectangular shape and may be a wedge-like shape.

The production method of the interlayer film according to the present invention is not particularly limited. Examples of the production method of the interlayer film according to the present invention include a method of separately forming resin compositions used for constituting respective layers into respective layers, and then layering the obtained layers, a method of coextruding resin compositions used for constituting respective layers with an extruder and layering the layers, and the like. A production method of extrusion-molding is preferred because the method is suitable for continuous production.

For excellent production efficiency of the interlayer film, when there are two surface layers, it is preferred that the two surface layers contain the same polyvinyl acetal resin, and it is more preferred that the two surface layers contain the same polyvinyl acetal resin and the same plasticizer. For excellent production efficiency of the interlayer film, it is further preferred that the two surface layers be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calendar roll method, a profile extrusion method, and the like. The emboss roll method is preferred because a large number of embosses of the protrusions and recesses, which is a quantitatively constant protrusion and recess pattern, can be formed.

(Laminated Glass)

The laminated glass according to the present invention includes a first lamination glass member, a second lamination glass member and the aforementioned interlayer film for laminated glass. In the laminated glass according to the present invention, the above-mentioned interlayer film for laminated glass is arranged between the first lamination glass member and the second lamination glass member.

The laminated glass according to the present invention includes a first lamination glass member, a second lamination glass member, and an interlayer film for laminated glass sandwiched between the first lamination glass member and the second lamination glass member. In the laminated glass according to the present invention, the interlayer film has a one-layer structure or a two or more-layer structure, and includes a resin layer.

It is preferred that in the laminated glass according to the present invention, the interlayer film have a ratio of a first storage modulus G' at a peak temperature of a maximum peak of tan δ to a second storage modulus G' at a temperature 100° C. higher than the peak temperature of the maximum peak of tan δ of 50 or more and 500 or less in viscoelasticity measurement at a frequency of 1 Hz in a shearing mode.

From the viewpoint of further enhancing the sound insulating property over a wide range of temperature, it is preferred that a primary loss factor be 0.15 or more over an entire temperature region of 0° C. or more and 40° C. or less in mechanical impedance measurement in conformity with ISO 16940 of the laminated glass according to the present invention.

From the viewpoint of further enhancing the sound insulating property over a wide range of temperature, it is preferred that a primary loss factor be 0.15 or more over an entire temperature region of 0° C. or more and 50° C. or less in mechanical impedance measurement in conformity with ISO 16940 of the laminated glass according to the present invention.

From the viewpoint of further enhancing the sound insulating property over a wide range of temperature, and from the viewpoint of further enhancing the sound insulating property against the running noise such as engine noise and road noise, in the laminated glass according to the present invention, it is preferred that the following first configuration and the following second configuration be satisfied when a sound transmission loss measurement including the following first, second and third steps is conducted.

First configuration: sound transmission loss at 500 Hz or more and 1000 Hz or less satisfies the following formula (1).

$$y \geq 10.1 \ln(x) - 35 \qquad \text{Formula (1)}$$

In formula (1), x means frequency (Hz), and y means sound transmission loss (dB).

Second configuration: sound transmission loss at 5000 Hz or more and 10000 Hz or less satisfies the following formula (2).

$$y \geq 12.8 \ln(x) - 68 \qquad \text{Formula (2)}$$

In formula (2), x means frequency (Hz), and y means sound transmission loss (dB).

First step: a laminated glass having a length of 500 mm and a width of 500 mm is prepared.

Second step: a reverberation room in conformity with ISO 10140-5 in which a first reverberation room serving as a sound source room, and a second reverberation room serving as a sound receiving room are connected is prepared. The laminated glass having a length of 500 mm and a width of 500 mm is placed between the first reverberation room and the second reverberation room.

Third step: sound transmission loss at 20° C. is measured at a center frequency of ⅓ octave band by an intensity method in conformity with JIS A1441-1.

In the first step, the laminated glass having a length of 500 mm and a width of 500 mm is prepared for measuring sound transmission loss. The laminated glass having a length of 500 mm and a width of 500 mm can be obtained, for example, by cutting a laminated glass. For example, when the lamination glass members of the laminated glass have a thickness of 2 mm, and the size of the laminated glass is a width of 500 mm or more and a length of 500 mm or more, the center part may be cut to have a width of 500 mm and a length of 500 mm.

FIG. 3 is a sectional view schematically showing an example of laminated glass prepared with the interlayer film for laminated glass shown in FIG. 1.

The laminated glass 31 shown in FIG. 3 is provided with a first lamination glass member 21, a second lamination glass member 22 and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of the second layer 2. The second lamination glass member 22 is layered on an outer surface 3a of a third layer 3.

FIG. 4 is a sectional view schematically showing an example of laminated glass prepared with the interlayer film for laminated glass shown in FIG. 2.

The laminated glass 31A shown in FIG. 4 is provided with a first lamination glass member 21, a second lamination glass member 22 and an interlayer film 11A. The interlayer film 11A is arranged between the first lamination glass member 21 and the second lamination glass member 22 to be sandwiched therebetween.

The first lamination glass member 21 is layered on a first surface 11a of the interlayer film 11A. The second lamination glass member 22 is layered on a second surface 11b opposite to the first surface 11a of the interlayer film 11A. The first lamination glass member 21 is layered on an outer surface 4a of the fourth layer 4. The second lamination glass member 22 is layered on an outer surface 5a of the fifth layer 5A.

As described above, the laminated glass according to the present invention includes a first lamination glass member, a second lamination glass member, and an interlayer film, and the interlayer film is the interlayer film for laminated glass according to the present invention. In the laminated glass according to the present invention, the above-mentioned interlayer film is arranged between the first lamination glass member and the second lamination glass member.

It is preferred that the first lamination glass member be the first glass plate. It is preferred that the second lamination glass member be the second glass plate.

Examples of the first and second lamination glass members include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and is preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, layers in the interlayer film may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

Hereinafter, the present invention will be described in more detail with reference to examples and comparative examples. The present invention is not limited only to these examples.

The following materials were prepared.

With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited. When the acetal is acetoacetal or the like, the acetalization degree is calculated by measuring the acetylation degree and the content of the hydroxyl group, and calculating a mole fraction from the obtained measurement results, and then subtracting the acetylation degree and the content of hydroxyl groups from 100% by mole.

(Resin)

Polyvinyl acetal resin (1) (n-butyraldehyde is used, polymerization degree: 1700, content of hydroxyl group: 33% by mole, acetylation degree: 1% by mole, acetalization degree: 66% by mole)

Polyvinyl acetal resin (2) (n-butyraldehyde is used, polymerization degree: 800, content of hydroxyl group: 31% by mole, acetylation degree: 1.5% by mole, acetalization degree: 67.5% by mole)

Polyvinyl acetal resin (X) (widely distributed PVB)(mixture of 50% by weight of polyvinyl acetal resin (XA) and 50% by weight of polyvinyl acetal resin (XB))

(polyvinyl acetal resin (XA): n-butyraldehyde is used, polymerization degree: 1700, content of hydroxyl group: 9.6% by mole, acetylation degree: 1% by mole, acetalization degree: 89.4% by mole, polyvinyl acetal resin (XB): n-butyraldehyde is used, polymerization degree: 1700, content of hydroxyl group: 13% by mole, acetylation degree: 1% by mole, acetalization degree: 86% by mole)

Polyvinyl acetal resin (Y) (n-butyraldehyde is used, polymerization degree: 1700, content of hydroxyl group: 18% by mole, acetylation degree: 8% by mole, acetalization degree: 74% by mole)

(Cured Product)

(Meth)acrylic polymer (1):

A polymerizable composition containing the following ingredients was prepared.

Ethyl acrylate 34 parts by weight
Benzyl acrylate 38 parts by weight
Hydroxypropyl acrylate 28 parts by weight
IRGACURE 184 (available from BASF) 0.2 parts by weight The polymerizable composition was sandwiched between two PET sheets having subjected to a mold release treatment on one side (available from Nippa Corporation, having a thickness of 50 μm) to form a polymerizable composition layer having a thickness of 100 μm. A spacer was arranged around the two PET sheets. The polymerizable composition layer was irradiated with ultraviolet rays at a dose of 3000 mJ/cm$^2$ with a high pressure mercury UV lamp to cure the polymerizable composition by reaction, and thus (meth)acrylic polymer (1) (layer of cured product, 100 μm thick) was formed. IRGACURE 184 is 2,2-dimethoxy-1,2-diphenylethan-1-one.

(Meth)acrylic Polymer (2):

A polymerizable composition containing the following ingredients was prepared.

Isobornyl acrylate 60 parts by weight Cyclic trimethylolpropane formal acrylate 40 parts by weight
IRGACURE 184 (available from BASF) 0.2 parts by weight The polymerizable composition was sandwiched between two PET sheets having subjected to a mold release treatment on one side (available from Nippa Corporation, having a thickness of 50 μm) to form a polymerizable composition layer having a thickness of 100 μm. A spacer was arranged around the two PET sheets. The polymerizable composition layer was irradiated with ultraviolet rays at a dose of 3000 mJ/cm$^2$ with a chemical lamp (FL20SBL, available from TOSHIBA CORPORATION) to cure the polymerizable composition by reaction, and thus (meth)acrylic polymer (2)(layer of cured product, 100 μm thick) was formed. IRGACURE 184 is 2,2-dimethoxy-1,2-diphenylethan-1-one.

(Meth)acrylic Polymer (3):

A polymerizable composition containing the following ingredients was prepared.

Isobornyl acrylate 70 parts by weight
Cyclic trimethylolpropane formal acrylate 25 parts by weight
4-hydroxybutyl acrylate 5 parts by weight
IRGACURE 184 (available from BASF) 0.2 parts by weight The polymerizable composition was sandwiched between two PET sheets having subjected to a mold release treatment on one side (available from Nippa Corporation, having a thickness of 50 μm) to form a polymerizable composition layer having a thickness of 100 μm. A spacer was arranged around the two PET sheets. The polymerizable composition layer was irradiated with ultraviolet rays at a dose of 3000 mJ/cm$^2$ with a chemical lamp (FL20SBL, available from TOSHIBA CORPORATION) to cure the polymerizable composition by reaction, and thus (meth)acrylic polymer (3)(layer of cured product, 100 μm thick) was formed. IRGACURE 184 is 2,2-dimethoxy-1,2-diphenylethan-1-one.

(Meth)acrylic Polymer (4):

A polymerizable composition containing the following ingredients was prepared.

Benzyl acrylate 9.1 parts by weight
Cyclic trimethylolpropane triacrylate 38.2 parts by weight
Butyl acrylate 43.6 parts by weight
Pentaerythritoltetrakis(3-mercaptobutylate) 0.23 parts by weight
Polyvinyl acetal resin (2) 9.1 parts by weight
IRGACURE 184 (available from BASF) 1.8 parts by weight Using the polymerizable composition, (meth)acrylic polymer (4) (layer of cured product, 860 μm thick) was formed in the same manner as in (meth)acrylic polymer (1).

(Meth)acrylic Polymer (A):

A polymerizable composition containing the following ingredients was prepared.

Dimethylaminoethyl acrylate 50 parts by weight
Hydroxypropyl acrylate 50 parts by weight
IRGACURE 184 (available from BASF) 0.2 parts by weight Using the polymerizable composition, (meth)acrylic polymer (A) (layer of cured product, 100 μm thick) was formed in the same manner as in (meth)acrylic polymer (1).

(Meth)acrylic Polymer (B):

A polymerizable composition containing the following ingredients was prepared.

Benzyl acrylate 7.6 parts by weight
Cyclic trimethylolpropane triacrylate 31.8 parts by weight
Butyl acrylate 36.4 parts by weight
Pentaerythritoltetrakis(3-mercaptobutylate) 0.19 parts by weight
Polyvinyl acetal resin (2) 24.2 parts by weight
IRGACURE 184 (available from BASF) 1.5 parts by weight Using the polymerizable composition, (meth)acrylic polymer (B) (layer of cured product, 860 μm thick) was formed in the same manner as in (meth)acrylic polymer (1).

(Plasticizer)

Triethylene glycol di-2-ethylhexanoate (3GO)

(Additive)

Additive (1): 9,9-Bis-[4-(2-hydroxyethoxy)phenyl]fluorene (Metal Salt M)

Mg mixture (50:50 (weight ratio) mixture of magnesium 2-ethylbutyrate and magnesium acetate)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

Example 1

Preparation of First Layer:

Acrylic polymer (1) (layer containing a cured product, 100 μm thick) was prepared.

Preparation of Second Layer and Third Layer:

The following ingredients were mixed, and kneaded sufficiently with a mixing roll to obtain a composition for forming a second layer and a third layer.

Polyvinyl acetal resin (1) 100 parts by weight
Plasticizer (3GO) 35 parts by weight
Metal salt M (Mg mixture) in such an amount that is 70 ppm in the obtained second layer and third layer
Ultraviolet ray screening agent (Tinuvin 326) in an amount of 0.2% by weight in the obtained second layer and third layer
Oxidation inhibitor (BHT) in an amount of 0.2% by weight in the obtained second layer and third layer The composition for forming the second layer and the third layer was extruded with an extruder to obtain a second layer and the third layer (each having a thickness of 380 μm).

Preparation of Interlayer Film:

A mold-release-treated PET sheet laminated on the first layer was peeled off, and the first layer and the second layer were bonded together by means of a roll laminator, and press-bonded to give a two-layer laminate. Subsequently, another mold-release-treated PET sheet laminated on the first layer was peeled off, and the first layer and the third layer were press-bonded in the same manner to obtain an interlayer film having a structure of second layer/first layer/third layer.

Preparation of Test Piece for Viscoelasticity Measurement:

The obtained interlayer film was cut into a size of 25 mm wide and 300 mm long. A first PET film and a second PET film were prepared, and the cut interlayer film was sandwiched between the two PET films to obtain a laminate. The laminate was put into a rubber bag and the inside thereof was degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate is subjected to press-bonding for 20 minutes under conditions of 135° C. and a pressure of 1.2 MPa in an autoclave, and then stored for 84 weeks or more in an environment at a room temperature of 23±2° C., and a humidity of 25±5% to obtain a test piece.

Preparation of Laminated Glass for Evaluation of Sound Insulating Property:

The obtained interlayer film was cut into a size of 25 mm wide and 300 mm long. As the first lamination glass member, and the second lamination glass member, two glass plates (clear float glass, 25 mm wide, 300 mm long and 2 mm thick) were prepared. The interlayer film was sandwiched between the two glass plates to obtain a laminate. The laminate was put into a rubber bag and the inside thereof was degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a laminated glass.

Example 2

Preparation of First Layer:

The following ingredients were mixed, and kneaded sufficiently with a mixing roll to obtain a composition for forming a first layer, and then the composition was press-molded to have a thickness of 100 μm to obtain a layer containing a cured product.

(Meth)acrylic polymer (2) 100 parts by weight
Plasticizer (3GO) 20 parts by weight Preparation of Second Layer and Third Layer:

The second and the third layers as prepared in Example 1 were prepared.

Preparation of Interlayer Film:

An interlayer film was obtained in the same manner as that in Example 1 except that the obtained first layer, and the obtained second and third layers were used.

Preparation of Test Piece for Viscoelasticity Measurement:

A test piece was obtained in the same manner as that in Example 1 except that the obtained interlayer film was used.

Preparation of Laminated Glass for Evaluation of Sound Insulating Property:

Laminated glass was obtained in the same manner as that in Example 1 except that the obtained interlayer film was used.

Example 3

Preparation of First Layer:

The following ingredients were mixed, and kneaded sufficiently with a mixing roll to obtain a composition for forming a first layer, and then the composition was press-molded to have a thickness of 100 μm to obtain a layer containing a cured product.

(Meth)acrylic polymer (3) 100 parts by weight
Plasticizer (3GO) 20 parts by weight Preparation of Second Layer and Third Layer:

The second and the third layers as prepared in Example 1 were prepared.

Preparation of Interlayer Film:

An interlayer film was obtained in the same manner as that in Example 1 except that the obtained first layer, and the obtained second and third layers were used.

Preparation of Test Piece for Viscoelasticity Measurement:

A test piece was obtained in the same manner as that in Example 1 except that the obtained interlayer film was used.

Preparation of Laminated Glass for Evaluation of Sound Insulating Property:

Laminated glass was obtained in the same manner as that in Example 1 except that the obtained interlayer film was used.

Preparation of Laminated Glass for Measurement of Sound Transmission Loss:

The obtained interlayer film was cut into a size of 500 mm long and 500 mm wide. As the first lamination glass member, and the second lamination glass member, two glass plates (green glass, 500 mm wide, 500 mm long and 2 mm thick) were prepared. The interlayer film was sandwiched between the two glass plates to obtain a laminate. The laminate was put into a rubber bag and the inside thereof was degassed for 20 minutes at a degree of vacuum of 2.6 kPa, after which the laminate was transferred into an oven while being degassed, and furthermore, held in place for 30 minutes at 90° C. and pressed under vacuum to subject the laminate to preliminary press-bonding. The preliminarily press-bonded laminate was subjected to press-bonding for 20 minutes under conditions of 135° C. and a pressure of 1.2 MPa in an autoclave to obtain a laminated glass, and then the laminated glass was stored for 84 weeks in an environment at a room temperature of 23±2° C., and a humidity of 25±5% to obtain a laminated glass for measurement of sound transmission loss.

Example 4

Preparation of Interlayer Film:
(Meth)acrylic polymer (4) (layer containing a cured product, 860 μm thick) was prepared as an interlayer film.
Preparation of Test Piece for Viscoelasticity Measurement:
A test piece was obtained in the same manner as that in Example 1 except that the obtained interlayer film was used.
Preparation of Laminated Glass for Evaluation of Sound Insulating Property:
Laminated glass was obtained in the same manner as that in Example 1 except that the obtained interlayer film was used.

Comparative Example 1

Preparation of First Layer:
The following ingredients were mixed, and kneaded sufficiently with a mixing roll to obtain a composition for forming a first layer, and then the composition was press-molded to have a thickness of 250 μm to obtain a layer containing polyvinyl acetal resin (X).
Polyvinyl acetal resin (X) 100 parts by weight
Plasticizer (3GO) 70 parts by weight
Preparation of Second Layer and Third Layer:
The second and the third layers as prepared in Example 1 were prepared.
Preparation of Interlayer Film:
An interlayer film was obtained in the same manner as that in Example 1 except that the obtained first layer, and the obtained second and third layers were used.
Preparation of Test Piece for Viscoelasticity Measurement:
A test piece was obtained in the same manner as that in Example 1 except that the obtained interlayer film was used.
Preparation of Laminated Glass for Evaluation of Sound Insulating Property:
Laminated glass was obtained in the same manner as that in Example 1 except that the obtained interlayer film was used.
Preparation of Laminated Glass for Measurement of Sound Transmission Loss:
A laminated glass was obtained in the same manner as that in Example 3 except that the obtained interlayer film was used.

Comparative Example 2

Preparation of First Layer:
(Meth)acrylic polymer (A) (layer containing a cured product, 100 μm thick) was prepared.
Preparation of Second Layer and Third Layer:
The second and the third layers as prepared in Example 1 were prepared.
Preparation of Interlayer Film:
An interlayer film was obtained in the same manner as that in Example 1 except that the obtained first layer, and the obtained second and third layers were used.
Preparation of Test Piece for Viscoelasticity Measurement:
A test piece was obtained in the same manner as that in Example 1 except that the obtained interlayer film was used.
Preparation of Laminated Glass for Evaluation of Sound Insulating Property:
Laminated glass was obtained in the same manner as that in Example 1 except that the obtained interlayer film was used.

Comparative Example 3

Preparation of First Layer:
The following ingredients were mixed, and kneaded sufficiently with a mixing roll to obtain a composition for forming a first layer, and then the composition was press-molded to have a thickness of 100 μm to obtain a layer containing polyvinyl acetal resin (Y).
Polyvinyl acetal resin (Y) 100 parts by weight
Triethylene glycol 60 parts by weight
Additive (1) 150 parts by weight
Preparation of Second Layer and Third Layer:
The second and the third layers as prepared in Example 1 were prepared.
Preparation of Interlayer Film:
An interlayer film was obtained in the same manner as that in Example 1 except that the obtained first layer, and the obtained second and third layers were used.
Preparation of Test Piece for Viscoelasticity Measurement:
A test piece was obtained in the same manner as that in Example 1 except that the obtained interlayer film was used.
Preparation of Laminated Glass for Evaluation of Sound Insulating Property:
Laminated glass was obtained in the same manner as that in Example 1 except that the obtained interlayer film was used.

Comparative Example 4

Preparation of Interlayer Film:
Acrylic polymer (B)(layer containing a cured product, 860 μm thick) was prepared as an interlayer film.
Preparation of Test Piece for Viscoelasticity Measurement:
A test piece was obtained in the same manner as that in Example 1 except that the obtained interlayer film was used.
Preparation of Laminated Glass for Evaluation of Sound Insulating Property:
Laminated glass was obtained in the same manner as that in Example 1 except that the obtained interlayer film was used.
(Evaluation)
(1) Measurement of Dynamic Viscoelasticity
For the obtained test piece for viscoelasticity measurement, the following items were evaluated by measuring dynamic viscoelasticity in the condition of raising the temperature from −50° C. to 200° C. at a temperature rising speed of 3° C./min. in a shearing mode, and in the condition of a frequency of 1 Hz and a strain of 1%, using a dynamic viscoelasticity analyzer (DVA-200 available from IT Keisoku Seigyo Co. Ltd.).
Peak temperature of maximum peak of tan δ
Maximum peak value of tan δ
First storage modulus G' at peak temperature of maximum peak of tan δ
Second storage modulus G' at a temperature 100° C. higher than peak temperature of maximum peak of tan δ
Ratio (first storage modulus G'/second storage modulus G')

(2) Primary Loss Factor (Sound Insulating Property)

For the obtained laminated glass for evaluation of sound insulating property, mechanical impedance was measured in conformity with ISO 16940. Specifically, the obtained laminated glass for evaluation of sound insulating property was excited with a vibration generator for damping test ("Vibrator G21-005D" available from Shinken. Co., Ltd.). The resultant vibration characteristic was amplified with a mechanical impedance measuring device ("XG-81" available from RION Co., Ltd.), and the vibration spectrum was analyzed with an FFT spectrum analyzer ("FFT analyzer SA-01A2" available from RION Co., Ltd.).

From the primary loss factor, sound insulating property was judged according to the following criteria.

[Criteria for Judgment in Sound Insulating Property]
 o: primary loss factor is 0.15 or more
 x: primary loss factor is less than 0.15

(3) Sound Transmission Loss

In a reverberation room in conformity with ISO 10140-5 in which a first reverberation room serving as a sound source room, and a second reverberation room serving as a sound receiving room are connected, a laminated glass for measurement of sound transmission loss obtained in Example and Comparative Example 1 was placed between the connected two reverberation rooms, the first reverberation room and the second reverberation room (sound source room, sound receiving room) in conformity with ISO10140-5. The sound transmission loss at 20° C. was measured by using a sound transmission loss measuring device available from RION Co., Ltd. "Intensity Probe SI-50, Multichannel Analyzer SA-02". Specifically, sound transmission loss (dB) in conformity with JIS A1441-1 was measured by an intensity method. The center frequency in measurement was ⅓ octave band.

From the obtained measurement value, whether the following formula (1) and the following formula (2) were satisfied was examined. In Table 3, the case of satisfying each of the following formula (1) and the following formula (2) was denoted by "o", and the case of not satisfying the formula (1) and the formula (2) was denoted by "x".

$$y \geq 10.1 \times \ln(x) - 35 \quad \text{Formula (1)}$$

$$y \geq 12.8 \times \ln(x) - 68 \quad \text{Formula (2)}$$

In formulas (1) and (2), x means frequency (Hz), and y means sound transmission loss (dB).

The feeling about the noise sensed inside the car while the automobile was travelling at a speed of 60 kilometers an hour was checked. When the noise sensed inside the car was not felt uncomfortable, the case was denoted by "◯", and when the noise was felt uncomfortable, the case was denoted by "x" in Table 3. When the engine noise or the road noise was negligible, the noise was evaluated as not being felt uncomfortable.

The details and the results are shown in the following Tables 1 to 3. In the following Tables 1, 2, description of Metal salt M, the ultraviolet ray screening agent, and the oxidation inhibitor was omitted. In Tables 1, 2, "E+03" means "$\times 10^3$", "E+04" means "$\times 10^4$", "E+05" means "$\times 10^5$", "E+06" means "$\times 10^6$", and "E+07" means "$\times 10^7$".

TABLE 1

| | | | Example 1 | Example 2 | Example 3 | Example 4 |
|---|---|---|---|---|---|---|
| Interlayer film | Second layer | Thickness (μm) | 380 | 380 | 380 | |
| | | Kind of cured product or resin | Polyvinyl acetal resin (1) | Polyvinyl acetal resin (1) | Polyvinyl acetal resin (1) | |
| | | Blending amount of cured product or resin (parts by weight) | 100 | 100 | 100 | |
| | | Kind of plasticizer | 3GO | 3GO | 3GO | |
| | | Blending amount of plasticizer (parts by weight) | 35 | 35 | 35 | |
| | First layer | Thickness (μm) | 100 | 100 | 100 | 860 |
| | | Kind of cured product or resin | (Meth)acrylic polymer (1) | (Meth)acrylic polymer (2) | (Meth)acrylic polymer (3) | (Meth)acrylic polymer (4) |
| | | Blending amount of cured product or resin (parts by weight) | 100 | 100 | 100 | 100 |
| | | Kind of plasticizer | — | 3GO | 3GO | — |
| | | Blending amount of plasticizer (parts by weight) | — | 20 | 20 | — |
| | | Kind of additive | — | — | — | — |
| | | Blending amount of additive (parts by weight) | — | — | — | — |
| | Third layer | Thickness (μm) | 380 | 380 | 380 | |
| | | Kind of cured product or resin | Polyvinyl acetal resin (1) | Polyvinyl acetal resin (1) | Polyvinyl acetal resin (1) | |
| | | Blending amount of cured product or resin (parts by weight) | 100 | 100 | 100 | |
| | | Kind of plasticizer | 3GO | 3GO | 3GO | |
| | | Blending amount of plasticizer (parts by weight) | 35 | 35 | 35 | |

TABLE 1-continued

|  |  | Example 1 | Example 2 | Example 3 | Example 4 |
|---|---|---|---|---|---|
| Evaluation | (1) Peak temperature at maximum peak of tanδ (° C.) | −4 | −3 | 1.1 | −3 |
|  | (1) Maximum value of tanδ peak | 2.6 | 3.1 | 2.9 | 2.1 |
|  | (1) First storage modulus G' (Pa) | 7.5E+06 | 3.1E+06 | 4.1E+06 | 1.2E+06 |
|  | (1) Second storage modulus G' (Pa) | 5.7E+04 | 8.4E+03 | 1.7E+04 | 2.5E+03 |
|  | (1) Ratio (first storage modulus G'/second storage modulus G') | 132 | 371 | 237 | 474 |
| (2) First loss factor | 0° C. | 0.20 | 0.16 | 0.17 | 0.15 |
|  | 10° C. | 0.32 | 0.29 | 0.31 | 0.19 |
|  | 20° C. | 0.36 | 0.46 | 0.50 | 0.25 |
|  | 30° C. | 0.25 | 0.44 | 0.45 | 0.22 |
|  | 40° C. | 0.17 | 0.34 | 0.37 | 0.19 |
|  | 50° C. | 0.15 | 0.22 | 0.25 | 0.16 |
| (2) Judgment of sound shielding property | 0° C. | ○ | ○ | ○ | ○ |
|  | 10° C. | ○ | ○ | ○ | ○ |
|  | 20° C. | ○ | ○ | ○ | ○ |
|  | 30° C. | ○ | ○ | ○ | ○ |
|  | 40° C. | ○ | ○ | ○ | ○ |
|  | 50° C. | ○ | ○ | ○ | ○ |

TABLE 2

|  |  |  | Comparative Example 1 | Comparative Example 2 | Comparative Example 3 | Comparative Example 4 |
|---|---|---|---|---|---|---|
| Interlayer film | Second layer | Thickness (μm) | 380 | 380 | 330 |  |
|  |  | Kind of cured product or resin | Polyvinyl acetal resin (1) | Polyvinyl acetal resin (1) | Polyvinyl acetal resin (1) |  |
|  |  | Blending amount of cured product or resin (parts by weight) | 100 | 100 | 100 |  |
|  |  | Kind of plasticizer | 3GO | 3GO | 3GO |  |
|  |  | Blending amount of plasticizer (parts by weight) | 35 | 35 | 35 |  |
|  | First layer | Thickness (μm) | 250 | 100 | 150 | 860 |
|  |  | Kind of cured product or resin | Polyvinyl acetal resin (X) | (Meth) acrylic polymer (A) | Polyvinyl acetal resin (Y) | (Meth) acrylic polymer (B) |
|  |  | Blending amount of cured product or resin (parts by weight) | 100 | 100 | 100 | 100 |
|  |  | Kind of plasticizer | 3GO | — | 3GO | — |
|  |  | Blending amount of plasticizer (parts by weight) | 70 | — | 60 | — |
|  |  | Kind of additive | — | — | Additive (1) | — |
|  |  | Blending amount of additive (parts by weight) | — | — | 150 | — |
|  | Third layer | Thickness (μm) | 380 | 380 | 330 |  |
|  |  | Kind of cured product or resin | Polyvinyl acetal resin (1) | Polyvinyl acetal resin (1) | Polyvinyl acetal resin (1) |  |
|  |  | Blending amount of cured product or resin (parts by weight) | 100 | 100 | 100 |  |
|  |  | Kind of plasticizer | 3GO | 3GO | 3GO |  |
|  |  | Blending amount of plasticizer (parts by weight) | 35 | 35 | 35 |  |
| Evaluation |  | (1) Peak temperature at maximum peak of tanδ (° C.) | −3 | 11 | 27.8 | −7 |
|  |  | (1) Maximum value of tanδ peak | 1.3 | 0.9 | 4 | 1.04 |
|  |  | (1) First storage modulus G' (Pa) | 9.9E+06 | 2.83E+06 | 1.7E+06 | 1.2E+07 |
|  |  | (1) Second storage modulus G' (Pa) | 2.3E+05 | 5.55E+03 | 2.6E+03 | 4.8E+03 |
|  |  | (1) Ratio (first storage modulus G'/second storage modulus G') | 43 | 510 | 679 | 2514 |
| (2) First loss factor | 0° C. |  | 0.03 | 0.01 | 0.04 | 0.07 |
|  | 10° C. |  | 0.12 | 0.02 | 0.08 | 0.18 |
|  | 20° C. |  | 0.29 | 0.05 | 0.14 | 0.20 |
|  | 30° C. |  | 0.25 | 0.15 | 0.26 | 0.15 |

TABLE 2-continued

|  |  | Comparative Example 1 | Comparative Example 2 | Comparative Example 3 | Comparative Example 4 |
| --- | --- | --- | --- | --- | --- |
|  | 40° C. | 0.14 | 0.12 | 0.36 | 0.10 |
|  | 50° C. | 0.12 | 0.09 | 0.22 | 0.08 |
| (2) Judgment of sound shielding property | 0° C. | x | x | x | x |
|  | 10° C. | x | x | x | ○ |
|  | 20° C. | ○ | x | x | ○ |
|  | 30° C. | ○ | ○ | ○ | ○ |
|  | 40° C. | x | x | ○ | x |
|  | 50° C. | x | x | ○ | x |

TABLE 3

|  |  | Example 3 | Comparative Example 1 |
| --- | --- | --- | --- |
| Sound transmission loss | Formula (1) | ○ | x |
|  | Formula (2) | ○ | x |
|  | Feeling about noise sensed inside car | ○ | x |

EXPLANATION OF SYMBOLS 1, 1A: First layer
1a: First surface
1b: Second surface
2, 2A: Second layer
2a: Outer surface
3, 3A: Third layer
3a: Outer surface
4A: Fourth layer
4a: Outer surface
5A: Fifth layer
5a: Outer surface
11, 11A: Interlayer film
11a: First surface
11b: Second surface
21: First lamination glass member
22: Second lamination glass member
31, 31A: Laminated glass

The invention claimed is:

1. An interlayer film for laminated glass having a one-layer structure or a two or more-layer structure,
the interlayer film comprising a resin layer,
the interlayer film having a ratio of a first storage modulus G' at a peak temperature of a maximum peak of tan δ to a second storage modulus G' at a temperature 100° C. higher than the peak temperature of the maximum peak of tan δ of 50 or more and 500 or less in viscoelasticity measurement at a frequency of 1 Hz in a shearing mode,
the peak temperature of the maximum peak of tan δ of the interlayer film being −20° C. or more,
the interlayer film including, as the resin layer, a layer containing a cured product and a plasticizer,
the cured product being a cured product of a curable compound having a (meth)acryloyl group,
a content of the plasticizer in the layer containing the cured product and the plasticizer being 20 parts by weight or more per 100 parts by weight of the cured product in the layer containing the cured product and the plasticizer.

2. The interlayer film for laminated glass according to claim 1, wherein the interlayer film for laminated glass has a two or more-layer structure.

3. The interlayer film for laminated glass according to claim 1, wherein a value of the maximum peak of tan δ is 2.0 or more.

4. The interlayer film for laminated glass according to claim 1, wherein
a primary loss factor is 0.15 or more over an entire temperature region of 0° C. or more and 40° C. or less in mechanical impedance measurement in conformity with ISO 16940 of a laminated glass X obtained through first, second and third steps,
the first step being a step in which an interlayer film having a width of 25 mm and a length of 300 mm is prepared, two sheets of clear float glass in conformity with JIS R3202 having a thickness of 2.0 mm, a width of 25 mm and a length of 300 mm are prepared, and the interlayer film is sandwiched between the two sheets of clear float glass to give a laminate X,
the second step being a step in which the obtained laminate X is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate X to preliminary press-bonding,
the third step being a step in which the preliminarily press-bonded laminate X is subjected to press-bonding for 20 minutes under conditions of 135° C. and a pressure of 1.2 MPa in an autoclave to obtain a laminated glass X.

5. The interlayer film for laminated glass according to claim 4, wherein a primary loss factor is 0.15 or more over an entire temperature region of 0° C. or more and 50° C. or less in mechanical impedance measurement in conformity with ISO 16940 of the laminated glass X.

6. The interlayer film for laminated glass according to claim 1, wherein the peak temperature of the maximum peak of tan δ is 20° C. or less.

7. The interlayer film for laminated glass according to claim 1, wherein
the interlayer film includes, as a second resin layer, a layer containing a resin that is different from a cured product of a photocurable compound, a cured product of a moisture-curable compound, and a cured product of a curable compound having a (meth)acryloyl group.

8. The interlayer film for laminated glass according to claim 7, wherein the resin contained in the layer containing a resin is a polyvinyl acetal resin.

9. The interlayer film for laminated glass according to claim 1, wherein
a first configuration and a second configuration are satisfied when a sound transmission loss measurement including first, second, third, fourth and fifth steps is conducted, the first configuration being a configuration in which sound transmission loss at 500 Hz or more and 1000 Hz or less satisfies Formula (1):

$$y \geq 10.1 \ln(x) - 35 \qquad \text{Formula (1)}$$

where x means frequency (Hz), and y means sound transmission loss (dB), the second configuration being a configuration in which sound transmission loss at 5000 Hz or more and 10000 Hz or less satisfies Formula (2):

$$y \geq 12.8 \ln(x) - 68 \qquad \text{Formula (2)}$$

where x means frequency (Hz), and y means sound transmission loss (dB), the first step being a step in which an interlayer film having a length of 500 mm and a width of 500 mm is prepared, two sheets of green glass having a thickness of 2 mm, a length of 500 mm and a width of 500 mm are prepared, and the interlayer film is sandwiched between the two sheets of green glass to give a laminate Y, the second step being a step in which the obtained laminate Y is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate Y to preliminary press-bonding, the third step being a step in which the preliminarily press-bonded laminate Y is subjected to press-bonding for 20 minutes under conditions of 135° C. and a pressure of 1.2 MPa in an autoclave, and stored for 84 weeks in an environment at a room temperature of 23±2° C., and a humidity of 25±5% to obtain a laminated glass Y, the fourth step being a step in which a reverberation room in conformity with ISO 10140-5 where a first reverberation room serving as a sound source room, and a second reverberation room serving as a sound receiving room are connected is prepared, and the obtained laminated glass Y is placed between the first reverberation room and the second reverberation room, the fifth step being a step in which sound transmission loss at 20° C. is measured at a center frequency of ⅓ octave band by an intensity method in conformity with JIS A1441-1.

10. A laminated glass comprising:
a first lamination glass member;
a second lamination glass member; and
the interlayer film for laminated glass according to claim 1,
the interlayer film for laminated glass being arranged between the first lamination glass member and the second lamination glass member.

11. An interlayer film for laminated glass having a one-layer structure or two or more-layer structure,
the interlayer film comprising a resin layer,
a peak temperature of a maximum peak of tan δ of the interlayer film being −20° C. or more in viscoelasticity measurement at a frequency of 1 Hz in a shearing mode,
the interlayer film including, as the resin layer, a layer containing a cured product and a plasticizer,
the cured product being a cured product of a curable compound having a (meth)acryloyl group, a content of the plasticizer in the layer containing the cured product and the plasticizer being 20 parts by weight or more per 100 parts by weight of the cured product in the layer containing the cured product and the plasticizer, the interlayer film satisfying a first configuration and a second configuration when a sound transmission loss measurement including first, second, third, fourth and fifth steps is conducted, the first configuration being a configuration in which sound transmission loss at 500 Hz or more and 1000 Hz or less satisfies Formula (1):

$$y \geq 10.1 \ln(x) - 35 \qquad \text{Formula (1)}$$

where x means frequency (Hz), and y means sound transmission loss (dB), the second configuration being a configuration in which sound transmission loss at 5000 Hz or more and 10000 Hz or less satisfies Formula (2):

$$y \geq 12.8 \ln(x) - 68 \qquad \text{Formula (2)}$$

where x means frequency (Hz), and y means sound transmission loss (dB), the first step being a step in which an interlayer film having a length of 500 mm and a width of 500 mm is prepared, two sheets of green glass having a thickness of 2 mm, a length of 500 mm and a width of 500 mm are prepared, and the interlayer film is sandwiched between the two sheets of green glass to give a laminate Y, the second step being a step in which the obtained laminate Y is put into a rubber bag and the inside thereof is degassed for 20 minutes at a degree of vacuum of 2.6 kPa, after which the laminate is transferred into an oven while being degassed, and furthermore, held in place at 90° C. for 30 minutes and pressed under vacuum to subject the laminate Y to preliminary press-bonding, the third step being a step in which the preliminarily press-bonded laminate Y is subjected to press-bonding for 20 minutes under conditions of 135° C. and a pressure of L2 MPa in an autoclave, and stored for 84 weeks in an environment at a room temperature of 23±2° C., and a humidity of 25±5% to obtain a laminated glass Y, the fourth step being a step in which a reverberation room in conformity with ISO 10140-5 where a first reverberation room serving as a sound source room, and a second reverberation room serving as a sound receiving room are connected is prepared, and the obtained laminated glass Y is placed between the first reverberation room and the second reverberation room, the fifth step being a step in which sound transmission loss at 20° C. is measured at a center frequency of ⅓ octave band by an intensity method in conformity with JIS A1441-1.

12. A laminated glass comprising:
a first lamination glass member;
a second lamination glass member; and
an interlayer film for laminated glass,
the interlayer film having a one-layer structure or a two or more-layer structure,
the interlayer film including a resin layer,
the interlayer film having a ratio of a first storage modulus G' at a peak temperature of a maximum peak of tan δ to a second storage modulus G' at a temperature 100°

C. higher than the peak temperature of the maximum peak of tan δ of 50 or more and 500 or less in viscoelasticity measurement at a frequency of 1 Hz in a shearing mode, the laminated glass having a primary loss factor of 0.15 or more over an entire temperature region of 0° C. or more and 40° C. or less in mechanical impedance measurement in conformity with ISO 16940 of the laminated glass, the peak temperature of the maximum peak of tan δ of the interlayer film being −20° C. or more, the interlayer film including, as the resin layer, a layer containing a cured product and a plasticizer, the cured product being a cured product of a curable compound having a (meth)acryloyl group, a content of the plasticizer in the layer containing the cured product and the plasticizer being 20 parts by weight or more per 100 parts by weight of the cured product in the layer containing the cured product and the plasticizer.

13. A laminated glass comprising:

a first lamination glass member;

a second lamination glass member; and an interlayer film for laminated glass, the interlayer film including a resin layer, a peak temperature of a maximum peak of tan δ of the interlayer film being −20° C. or more in viscoelasticity measurement at a frequency of 1 Hz in a shearing mode, the interlayer film including, as the resin layer, a layer containing a cured product and a plasticizer, the cured product being a cured product of a curable compound having a (meth)acryloyl group, a content of the plasticizer in the layer containing the cured product and the plasticizer being 20 parts by weight or more per 100 parts by weight of the cured product in the layer containing the cured product and the plasticizer, the laminated glass satisfying a first configuration and a second configuration when a sound transmission loss measurement including first, second, and third steps is conducted, the first configuration being a configuration in which sound transmission loss at 500 Hz or more and 1000 Hz or less satisfies Formula (1):

$$y \geq 10.1 \ln(x) - 35 \quad \text{Formula (1)}$$

where x means frequency (Hz), and y means sound transmission loss (dB), the second configuration being a configuration in which sound transmission loss at 5000 Hz or more and 10000 Hz or less satisfies Formula (2):

$$y \geq 12.8 \ln(x) - 68 \quad \text{Formula (2)}$$

where x means frequency (Hz), and y means sound transmission loss (dB), the first step being a step in which a laminated glass having a length of 500 mm and a width of 500 mm is prepared, the second step being a step in which a reverberation room in conformity with ISO 10140-5 where a first reverberation room serving as a sound source room, and a second reverberation room serving as a sound receiving room are connected is prepared, and the laminated glass having a length of 500 mm and a width of 500 mm is placed between the first reverberation room and the second reverberation room, the third step being a step in which sound transmission loss at 20° C. is measured at a center frequency of ⅓ octave band by an intensity method in conformity with JIS A1441-1.

* * * * *